United States Patent
Bhamri et al.

(10) Patent No.: US 12,200,673 B2
(45) Date of Patent: Jan. 14, 2025

(54) USER EQUIPMENT AND SCHEDULING NODE

(71) Applicant: Panasonic Intellectual Property Corporation of America, Torrance, CA (US)

(72) Inventors: Ankit Bhamri, Rödermark (DE); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 279 days.

(21) Appl. No.: 17/554,494

(22) Filed: Dec. 17, 2021

(65) Prior Publication Data

US 2022/0167352 A1  May 26, 2022

Related U.S. Application Data

(63) Continuation of application No. PCT/EP2020/072454, filed on Aug. 11, 2020.

(30) Foreign Application Priority Data

Aug. 14, 2019  (EP) ..................... 19191801

(51) Int. Cl.
*H04W 72/0446* (2023.01)
*H04W 72/23* (2023.01)

(52) U.S. Cl.
CPC ....... *H04W 72/0446* (2013.01); *H04W 72/23* (2023.01)

(58) Field of Classification Search
CPC .............. H04W 72/0446; H04W 72/23
See application file for complete search history.

(56) References Cited

U.S. PATENT DOCUMENTS

2014/0098770 A1  4/2014  Zhou et al.
2019/0149365 A1  5/2019  Chatterjee et al.
(Continued)

FOREIGN PATENT DOCUMENTS

CN  109845371 A  6/2019
CN  109962765 A  7/2019
(Continued)

OTHER PUBLICATIONS

3GPP, "3rd Generation Partnership Project; Technical Specification Group Radio Access Network; NR; NR and NG-RAN Overall Description; Stage 2 (Release 15)," 3GPP TS 38.300 V15.6.0, Jun. 2019, 99 pages.
(Continued)

*Primary Examiner* — Brian P Cox
(74) *Attorney, Agent, or Firm* — Seed IP Law Group LLP

(57) ABSTRACT

The present disclosure relates to a user equipment, UE, and a scheduling node, as well as to the corresponding methods. In particular, a downlink control information, DCI, signaling carries a Transmission Configuration Indication, TCI, indicator specifying that two or more TCI states are configured; and an indication indicating time-domain resources for transmissions and associations of the time-domain resources with the two or more TCI states, wherein each of the time-domain resources is associated with one of the two or more TCI states; wherein the transceiver, in operation, receives or transmits, for each of the two or more TCI states, data on the time-domain resources associated with the respective TCI state.

14 Claims, 13 Drawing Sheets

(56) References Cited

U.S. PATENT DOCUMENTS

| | | | |
|---|---|---|---|
| 2019/0159213 A1 | 5/2019 | Baldemair et al. | |
| 2019/0182807 A1 | 6/2019 | Panteleev et al. | |
| 2019/0335491 A1* | 10/2019 | Venugopal | H04W 72/23 |
| 2020/0015200 A1* | 1/2020 | Vilaipornsawai | H04W 72/23 |
| 2020/0044793 A1* | 2/2020 | Sundararajan | H04L 1/1887 |
| 2020/0221429 A1* | 7/2020 | Li | H04L 5/0053 |
| 2020/0278732 A1 | 9/2020 | Horvath | |
| 2020/0366433 A1 | 11/2020 | Qin et al. | |
| 2022/0070903 A1 | 3/2022 | Li | |
| 2022/0167322 A1* | 5/2022 | Takahashi | H04B 7/0691 |

FOREIGN PATENT DOCUMENTS

| | | |
|---|---|---|
| CN | 110034842 A | 7/2019 |
| TW | 201914242 A | 4/2019 |
| WO | 2019/047950 A1 | 3/2019 |
| WO | WO 2019051242 A2 | 3/2019 |
| WO | WO 2019137308 A1 | 7/2019 |
| WO | WO 2019137441 A1 | 7/2019 |
| WO | WO 2020225690 A1 | 11/2020 |

OTHER PUBLICATIONS

3GPP, "3rd Generation Partnership Project; Technical Specification Group Radio Access Network; Study on new radio access technology: Radio access architecture and interfaces (Release 14)," 3GPP TR 38.801 V14.0.0, Mar. 2017, 91 pages.

3GPP, "3rd Generation Partnership Project; Technical Specification Group Radio Access Network; NR; Physical channels and modulation (Release 15)," 3GPP TS 38.211 V15.6.0, Jun. 2019, 97 pages.

3GPP, "3rd Generation Partnership Project; Technical Specification Group Radio Access Network; NR; Physical channels and modulation (Release 15)," 3GPP TS 38.211 V15.3.0, Sep. 2018, 96 pages.

3GPP, "3rd Generation Partnership Project; Technical Specification Group Services and System Aspects; System Architecture for the 5G System; Stage 2 (Release 16)," 3GPP TS 23.501 V16.1.0, Jun. 2019, 368 pages.

3GPP, "3rd Generation Partnership Project; Technical Specification Group Radio Access Network; NR; Multiplexing and channel coding (Release 15)," 3GPP TS 38.212 V15.6.0, Jun. 2019, 101 pages.

3GPP, "3rd Generation Partnership Project; Technical Specification Group Radio Access Network; Scenarios and requirements for small cell enhancements for E-UTRA and E-UTRAN (Release 15)," 3GPP TR 36.932 V15.0.0, Jun. 2018, 14 pages.

3GPP, "3rd Generation Partnership Project; Technical Specification Group Radio Access Network; Study on Scenarios and Requirements for Next Generation Access Technologies; (Release 15)," 3GPP TR 38.913 V15.0.0, Jun. 2018, 39 pages.

Extended European Search Report, dated Feb. 13, 2020, for European Application No. 19191801.0-1215, 8 pages.

International Search Report, mailed Sep. 28, 2020, for International Application No. PCT/EP2020/072454, 3 pages.

Indian Office Action, mailed Mar. 19, 2024, for Indian Application No. 202247007056, 7 pages. (With Translation).

European Communication, dated Apr. 22, 2024, for European Patent Application No. 20 751 172.6-1203. (5 pages).

Ericsson, "On schemes 3 and 4 for URLLC with Multi-TRP," R1-1907515, Agenda Item: 7.2.8.5, 3GPP TSG RAN WG1 Meeting #97, Reno, USA, May 13-17, 2019. (3 page).

Huawei, HiSilicon, "Enhancements on Multi-TRP/panel transmission," R1-1906029, Agenda Item: 7.2.8.2, 3GPP TSG RAN WG1 #97, Reno, USA, May 13-17, 2019. (17 pages).

Reasons for Rejection, dated Jul. 2, 2024, for Japanese Patent Application 2022-508594. (17 pages) (with English Translation).

* cited by examiner

USER EQUIPMENT AND SCHEDULING NODE

BACKGROUND

Technical Field

The present disclosure relates to transmission and reception of signals in a communication system. In particular, the present disclosure relates to methods and apparatuses for such transmission and reception.

Description of the Related Art

The 3rd Generation Partnership Project (3GPP) works at technical specifications for the next generation cellular technology, which is also called fifth generation (5G) including "New Radio" (NR) radio access technology (RAT), which operates in frequency ranges up to 100 GHz. The NR is a follower of the technology represented by Long Term Evolution (LTE) and LTE Advanced (LTE-A).

For systems like LTE, LTE-A, and NR, further modifications and options may facilitate efficient operation of the communication system as well as particular devices pertaining to the system.

BRIEF SUMMARY

One non-limiting and exemplary embodiment facilitates efficiently utilizing resources including an efficient signaling of time-domain resources for multiple transmission/reception points (TRPs), i.e., for multiple transmission configuration indication (TCI) states.

In an embodiment, the techniques disclosed herein feature a user equipment, UE, comprising a transceiver which, in operation, receives downlink control information, DCI, signaling; and a processor which, in operation, obtains from the DCI signaling: a Transmission Configuration Indication, TCI, indicator specifying that two or more TCI states are configured; and an indication indicating time-domain resources for transmissions and associations of the time-domain resources with the two or more TCI states, wherein each of the time-domain resources is associated with one of the two or more TCI states; wherein the transceiver, in operation, receives or transmits, for each of the two or more TCI states, data on the time-domain resources associated with the respective TCI state.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following, exemplary embodiments are described in more detail with reference to the attached figures and drawings.

DETAILED DESCRIPTION

5G NR System Architecture and Protocol Stacks

3GPP has been working at the next release for the $5^{th}$ generation cellular technology, simply called 5G, including the development of a new radio access technology (NR) operating in frequencies ranging up to 100 GHz. The first version of the 5G standard was completed at the end of 2017, which allows proceeding to 5G NR standard-compliant trials and commercial deployments of smartphones.

Figure 1:
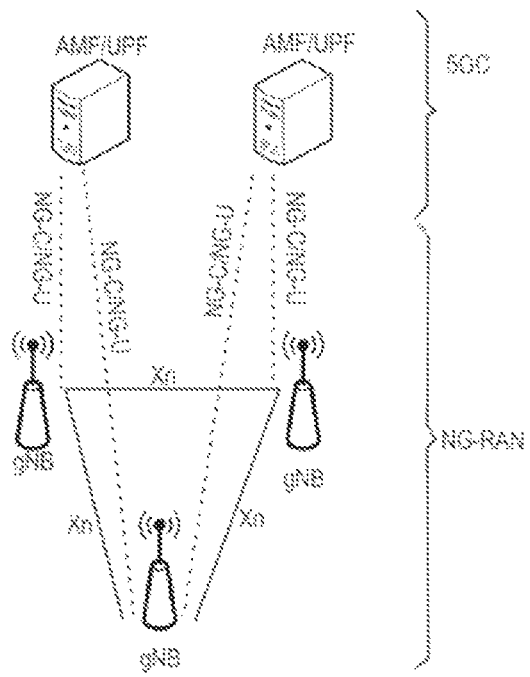
FIG. 1 is a schematic drawing showing an exemplary architecture for a 3GPP NR system.

Among other things, the overall system architecture assumes an NG-RAN (Next Generation-Radio Access Network) that comprises gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 1 (see, e.g., 3GPP TS 38.300 v15.6.0, section 4).

Figure 2:
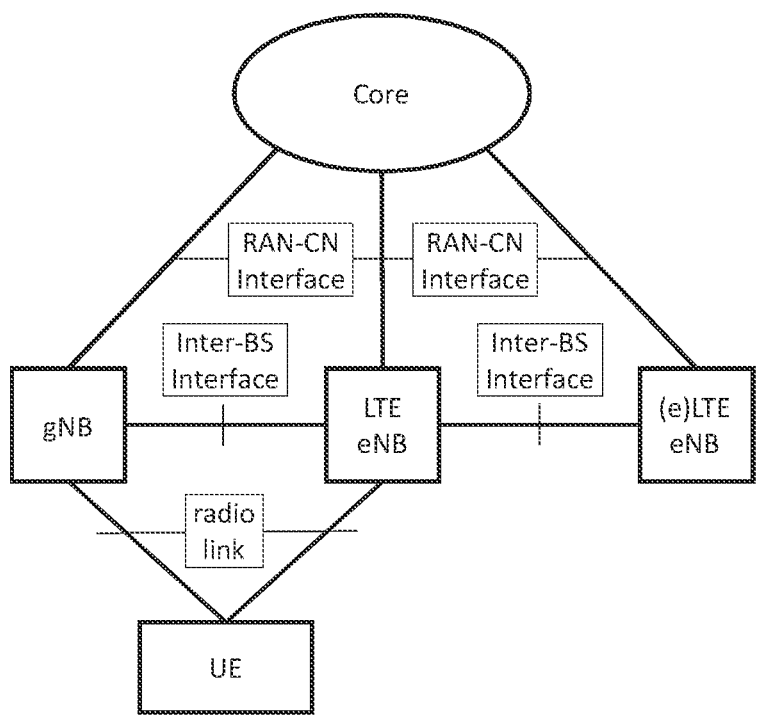
FIG. 2 is a block diagram which shows an exemplary user and control plane architecture for the LTE eNB, gNB, and UE.

Various different deployment scenarios can be supported (see, e.g., 3GPP TR 38.801 v14.0.0). For instance, a non-centralized deployment scenario (see, e.g., section 5.2 of TR 38.801; a centralized deployment is illustrated in section 5.4) is presented therein, where base stations supporting the 5G NR can be deployed. FIG. 2 illustrates an exemplary non-centralized deployment scenario (see, e.g., FIG. 5.2.-1 of said TR 38.801), while additionally illustrating an LTE eNB as well as a user equipment (UE) that is connected to both a gNB and an LTE eNB. The new eNB for NR 5G may be exemplarily called gNB. An eLTE eNB is the evolution of an eNB that supports connectivity to the EPC (Evolved Packet Core) and the NGC (Next Generation Core).

The user plane protocol stack for NR (see, e.g., 3GPP TS 38.300, section 4.4.1) comprises the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new access stratum (AS) sublayer (SDAP, Service Data Adaptation Protocol) is introduced above PDCP (see, e.g., sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the PDCP, RLC and MAC sublayers are listed respectively in sections 6.4, 6.3, and 6.2 of TS 38.300. The functions of the RRC layer are listed in sub-clause 7 of TS 38.300.

For instance, the Medium-Access-Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. It also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. One physical channel is the PRACH (Physical Random Access Channel) used for the random access.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability (1-10$^{-5}$ within 1 ms). Finally, mMTC may preferably require high connection density (1,000,000 devices/km$^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration $T_u$ and the subcarrier spacing $\Delta f$ are directly related through the formula $\Delta f=1/T_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v15.6.0).

5G NR Functional Split Between NG-RAN and 5GC

Figure 3:
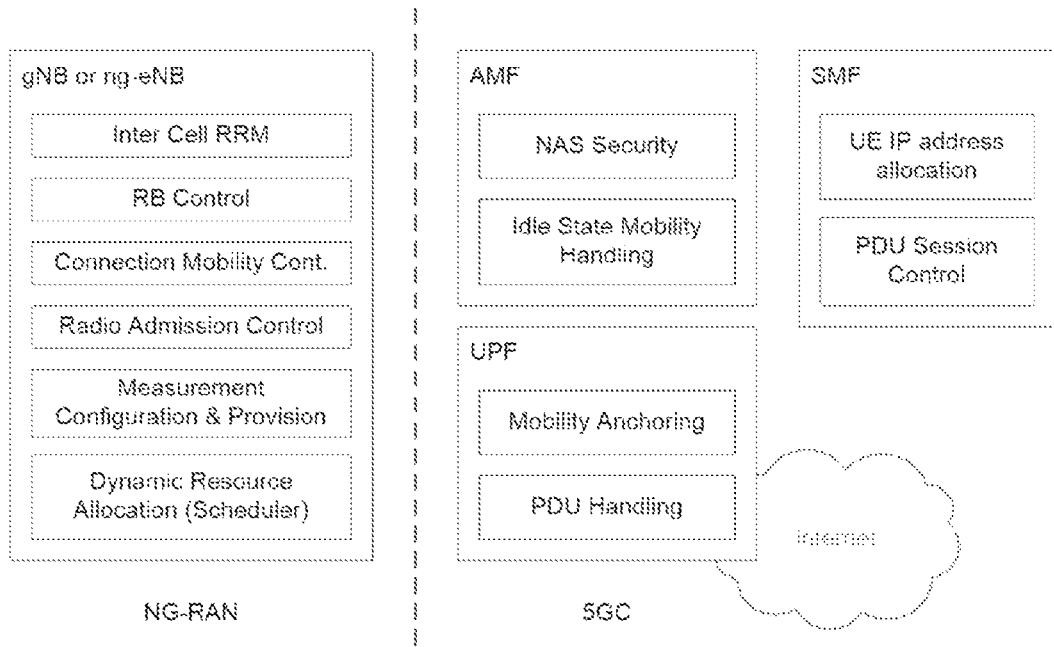
FIG. 3 is a schematic drawing which shows functional split between NG-RAN and 5GC.

FIG. 3 illustrates functional split between NG-RAN and 5GC. NG-RAN logical node is a gNB or ng-eNB. The 5GC has logical nodes AMF, UPF and SMF.

In particular, the gNB and ng-eNB host the following main functions:

Functions for Radio Resource Management such as Radio Bearer Control, Radio Admission Control, Connection Mobility Control, Dynamic allocation of resources to UEs in both uplink and downlink (scheduling);
IP header compression, encryption and integrity protection of data;
Selection of an AMF at UE attachment when no routing to an AMF can be determined from the information provided by the UE;
Routing of User Plane data towards UPF(s);
Routing of Control Plane information towards AMF;
Connection setup and release;
Scheduling and transmission of paging messages;
Scheduling and transmission of system broadcast information (originated from the AMF or OAM);
Measurement and measurement reporting configuration for mobility and scheduling;
Transport level packet marking in the uplink;
Session Management;
Support of Network Slicing;
QoS Flow management and mapping to data radio bearers;
Support of UEs in RRC_INACTIVE state;
Distribution function for NAS messages;
Radio access network sharing;
Dual Connectivity;
Tight interworking between NR and E-UTRA.

The Access and Mobility Management Function (AMF) hosts the following main functions:

Non-Access Stratum, NAS, signaling termination;
NAS signaling security;
Access Stratum, AS, Security control;
Inter Core Network, CN, node signaling for mobility between 3GPP access networks;
Idle mode UE Reachability (including control and execution of paging retransmission);
Registration Area management;
Support of intra-system and inter-system mobility;
Access Authentication;
Access Authorization including check of roaming rights;
Mobility management control (subscription and policies);
Support of Network Slicing;
Session Management Function, SMF, selection.

Furthermore, the User Plane Function, UPF, hosts the following main functions:
  Anchor point for Intra-/Inter-RAT mobility (when applicable);
  External PDU session point of interconnect to Data Network;
  Packet routing & forwarding;
  Packet inspection and User plane part of Policy rule enforcement;
  Traffic usage reporting;
  Uplink classifier to support routing traffic flows to a data network;
  Branching point to support multi-homed PDU session;
  QoS handling for user plane, e.g., packet filtering, gating, UL/DL rate enforcement;
  Uplink Traffic verification (SDF to QoS flow mapping);
  Downlink packet buffering and downlink data notification triggering.

Finally, the Session Management function, SMF, hosts the following main functions:
  Session Management;
  UE IP address allocation and management;
  Selection and control of UP function;
  Configures traffic steering at User Plane Function, UPF, to route traffic to proper destination;
  Control part of policy enforcement and QoS;
  Downlink Data Notification.

RRC Connection Setup and Reconfiguration Procedures

Figure 4:
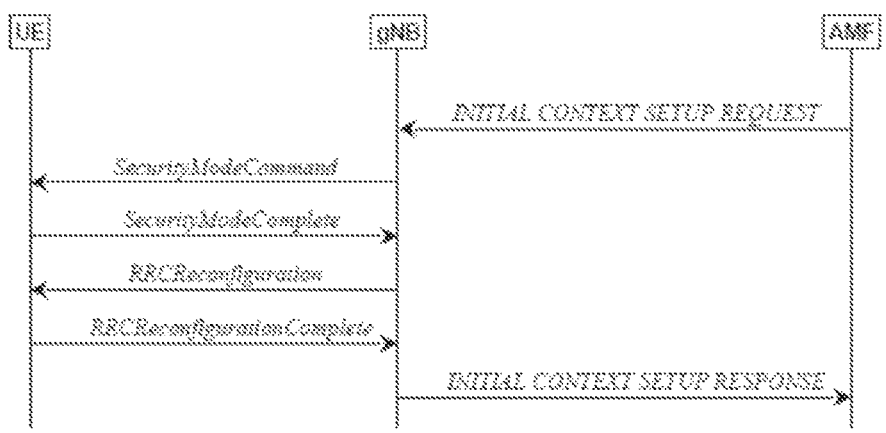
FIG. 4 is a sequence diagram for RRC connection setup/reconfiguration procedures.

FIG. 4 illustrates some interactions between a UE, gNB, and AMF (an 5GC entity) in the context of a transition of the UE from RRC_IDLE to RRC_CONNECTED for the NAS part (see TS 38.300 v15.6.0).

RRC is a higher layer signaling (protocol) used for UE and gNB configuration. In particular, this transition involves that the AMF prepares the UE context data (including, e.g., PDU session context, the Security Key, UE Radio Capability and UE Security Capabilities, etc.) and sends it to the gNB with the INITIAL CONTEXT SETUP REQUEST. Then, the gNB activates the AS security with the UE, which is performed by the gNB transmitting to the UE a SecurityModeCommand message and by the UE responding to the gNB with the SecurityModeComplete message. Afterwards, the gNB performs the reconfiguration to setup the Signaling Radio Bearer 2, SRB2, and Data Radio Bearer(s), DRB(s) by means of transmitting to the UE the RRCReconfiguration message and, in response, receiving by the gNB the RRCReconfigurationComplete from the UE. For a signaling-only connection, the steps relating to the RRCReconfiguration are skipped since SRB2 and DRBs are not setup. Finally, the gNB informs the AMF that the setup procedure is completed with the INITIAL CONTEXT SETUP RESPONSE.

In the present disclosure, thus, an entity (for example AMF, SMF, etc.) of a 5th Generation Core (5GC) is provided that comprises control circuitry which, in operation, establishes a Next Generation (NG) connection with a gNodeB (or gNB), and a transmitter which, in operation, transmits an initial context setup message, via the NG connection, to the gNodeB to cause a signaling radio bearer setup between the gNodeB and a user equipment (UE). In particular, the gNodeB transmits a Radio Resource Control, RRC, signaling containing a resource allocation configuration information element to the UE via the signaling radio bearer. The UE then performs an uplink transmission or a downlink reception based on the resource allocation configuration.

Usage Scenarios of IMT for 2020 and Beyond

Figure 5:
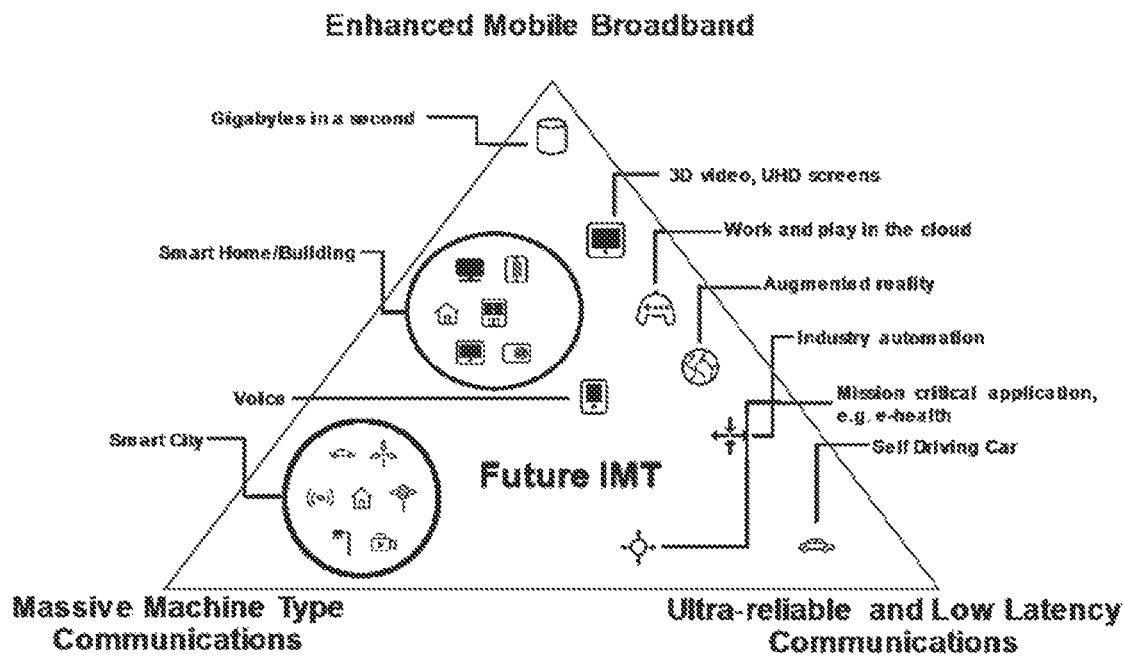
FIG. 5 is a schematic drawing showing usage scenarios of Enhanced mobile broadband, Massive Machine Type Communications (mMTC) and Ultra Reliable and Low Latency Communications (URLLC)

FIG. 5 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications. FIG. 5 illustrates some examples of envisioned usage scenarios for IMT for 2020 and beyond.

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a BLER (block error rate) of 1E-5 for a packet size of 32 bytes with a user plane latency of 1 ms.

From RAN1 perspective, reliability can be improved in a number of possible ways. The current scope for improving the reliability involves defining separate CQI tables for URLLC, more compact DCI formats, repetition of PDCCH, etc. However, the scope may widen for achieving ultra-reliability as the NR becomes more stable and developed (for NR URLLC key requirements). Particular use cases of NR URLCC in Rel. 15 include Augmented Reality/Virtual Reality (AR/VR), e-health, e-safety, and mission-critical applications.

Moreover, technology enhancements targeted by NR URLCC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLCC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, and especially necessary for URLLC and mMTC, is high reliability or ultra-reliability. Several mechanisms can be considered to improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability in general, regardless of particular communication scenarios.

For NR URLLC, further use cases with tighter requirements have been identified such as factory automation, transport industry and electrical power distribution, including factory automation, transport industry, and electrical power distribution. The tighter requirements are higher reliability (up to 10-6 level), higher availability, packet sizes of up to 256 bytes, time synchronization down to the order of a few μs where the value can be one or a few μs depending on frequency range and short latency in the order of 0.5 to 1 ms in particular a target user plane latency of 0.5 ms, depending on the use cases.

Moreover, for NR URLCC, several technology enhancements from RAN1 perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements have been identified. The term "mini-slot" refers to a Transmission Time Interval (TTI) including a smaller number of symbols than a slot (a slot comprising fourteen or twelve symbols).

In slot-based scheduling or assignment, a slot corresponds to the timing granularity (TTI—transmission time interval) for scheduling assignment. In general, TTI determines the timing granularity for scheduling assignment. One TTI is the time interval in which given signals is mapped to the physical layer. For instance, conventionally, the TTI length can vary from 14-symbols (slot-based scheduling) to 2-symbols (non-slot based scheduling). Downlink (DL) and uplink (UL) transmissions are specified to be organized into frames (10 ms duration) consisting of 10 subframes (1 ms duration). In slot-based transmission, a subframe is further divided into slots, the number of slots being defined by the numerology/subcarrier spacing. The specified values range between 10 slots per frame (1 slot per subframe) for a subcarrier spacing of 15 kHz to 80 slots per frame (8 slots per subframe) for a subcarrier spacing of 120 kHz. The number of OFDM symbols per slot is 14 for normal cyclic prefix and 12 for extended cyclic prefix (see section 4.1 (general frame structure), 4.2 (Numerologies), 4.3.1 (frames and subframes) and 4.3.2 (slots) of the 3GPP TS 38.211 V15.3.0, Physical channels and modulation, 2018-09). However, assignment of time resources for transmission may also be non-slot based. In particular, the TTIs in non slot-based assignment may correspond to mini-slots rather than slots, i.e., one or more mini-slots may be assign to a requested transmission of data/control signaling. In non slot-based assignment, the minimum length of a TTI may for instance be 1 or 2 OFDM symbols.

QoS Control

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearers (DRB) together with the PDU Session, and additional DRB(s) for QoS flow(s) of that PDU session can be subsequently configured (it is up to NG-RAN when to do so), e.g., as shown above with reference to FIG. 4. The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 6:
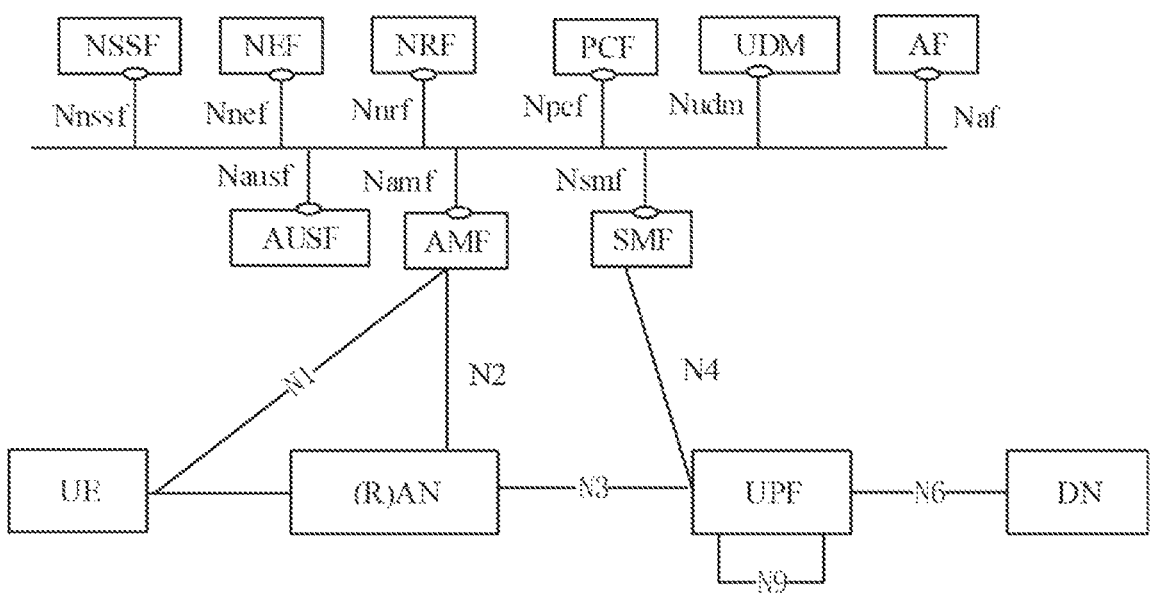
FIG. 6 is a block diagram which shows an exemplary 5G system architecture.

FIG. 6 illustrates a 5G NR non-roaming reference architecture (see TS 23.501 v16.1.0, section 4.23). An Application Function (AF), e.g., an external application server hosting 5G services exemplary described in FIG. 5, interacts with the 3GPP Core Network in order to provide services, for example to support application influence on traffic routing, accessing Network Exposure Function (NEF) or interacting with the Policy framework for policy control (see Policy Control Function, PCF), e.g., QoS control. Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 6 shows further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN), e.g., operator services, Internet access or 3rd party services.

A terminal or user terminal, or user device is referred to in the LTE and NR as a user equipment (UE). This may be a mobile device or communication apparatus such as a wireless phone, smartphone, tablet computer, or an USB (universal serial bus) stick with the functionality of a user equipment. However, the term mobile device is not limited thereto, in general, a relay may also have functionality of such mobile device, and a mobile device may also work as a relay.

A base station is a network node, e.g., forming a part of the network for providing services to terminals. A base station is a network node or scheduling node, which provides wireless access to terminals. Communication between the terminal and the base station is typically standardized. In LTE and NR, the wireless interface protocol stack includes physical layer, medium access layer (MAC) and higher layers. In control plane, higher-layer protocol Radio Resource Control protocol is provided. Via RRC, the base station can control configuration of the terminals and terminals may communicate with the base station to perform control tasks such as connection and bearer establishment, modification, or the like, measurements, and other functions. The terminology used in LTE is eNB (or eNodeB), while the currently used terminology for 5G NR is gNB.

Services for transfer of data provided by a layer to the higher layers are usually referred to as channels. For example, the LTE and the NR distinguish logical channels provided for higher layers by the MAC layer, transport channels provided by the physical layer to the MAC layer and physical channels which define mapping on the physical resources.

Logical channels are different kinds of data transfer services as offered by MAC. Each logical channel type is defined by what type of information is transferred. Logical channels are classified into two groups: Control Channels and Traffic Channels. Control channels are used for the transfer of control plane information only. Traffic channels are used for the transfer of user plane information only.

Logical Channels are then mapped by the MAC layer onto transport channels. For example, logical traffic channels and some logical control channels may be mapped onto the transport channel referred to as downlink shared channel DL-SCH in downlink and onto the transport channel referred to as uplink shared channel UL-SCH in uplink.

Downlink Control Channel Monitoring, PDCCH, DCI

Many of the functions operated by the UE involve the monitoring of a downlink control channel (e.g., the PDCCH, see 3GP TS 38.300 v15.6.0, section 5.2.3) to receive, e.g., particular control information or data destined to the UE.

As mentioned above, the PDCCH monitoring is done by the UE so as to identify and receive information intended for the UE, such as the control information as well as the user traffic (e.g., the DCI on the PDCCH, and the user data on the PDSCH indicated by the PDCCH).

Control information in the downlink (can be termed downlink control information, DCI) has the same purpose in 5G NR as the DCI in LTE, namely being a special set of control information that, e.g., schedules a downlink data channel (e.g., the PDSCH) or an uplink data channel (e.g., PUSCH). In 5G NR there are a number of different DCI Formats defined already (see TS 38.212 v15.6.0 section 7.3.1).

The PDCCH monitoring of each of these functions serves a particular purpose and is thus started to said end. The PDCCH monitoring is typically controlled at least based on a timer, operated by the UE. The timer has the purpose of controlling the PDCCH monitoring, e.g., limiting the maximum amount of time that the UE is to monitor the PDCCH. For instance, the UE may not need to indefinitely monitor the PDCCH, but may stop the monitoring after some time so as to be able to save power.

As mentioned above, one of the purposes of DCI on the PDCCH is the dynamic scheduling of resources in downlink or uplink or even sidelink. In particular, some formats of DCI are provided to carry indication of resources (resource allocation, RA) allocated to a data channel for a particular user. The resource allocation may include specification of resources in frequency domain and/or time domain.

Resource Allocation

In time domain, as for instance specified in Release 15 (NR), the scheduling timing (e.g., for the scheduling of resources described above) may be indicated within the DCI by using a Time Domain Resource Allocation (TDRA) table. In particular, a UE may be notified of allocated resources in time domain by indicating one entry (a row) of said TDRA table in the DCI, for instance, by signaling an entry (row) index. The term table is used herein as a logical term, as the TDRA entries are summarized, for NR, as a table in a standard specification.

Repetitions on PDSCH and PUSCH

The transmissions in NR may include spontaneous (i.e., without being triggered by an (H)ARQ) repetitions of data. In such case, the same data (e.g., transport block) is transmitted N times, N being an integer larger than one. The number of repetitions may be configurable.

Multiple Transmission/Reception Points, TRP

The physical layer in NR may provide multi-antenna operation such as MIMO (multiple input, multiple output) which may, for instance, include the use of plural or multiple transmission and reception points (multi-TRP). For instance, user equipment may receive data from plural TRPs (transmission and reception points), wherein the plural-TRPs may be controlled by the same or different network nodes. The terms multi-point transmission or coordinated multi-point transmission (CoMP) may also be used for multi-TRP communication or transmission.

The technologies described in the present disclosure are not limited to a particular arrangement of TRPs, or a particular relationship between TRPs and gNBs. Accordingly, for instance, multi-TRP operation may be performed by a gNB having different antenna panels or radio heads corresponding to the TRPs and different radio frequency units operating with the respective antennas.

Moreover, in multi-TRP, several options are conceivable with respect to the positional relationship between TRPs, and the distance between two TRPs may vary. For instance, the TRPs may be close, so that a UE receives signals from these TRPs from a similar angle. However, TRPs may also be located at a rather far distance from each other, for instance at remote locations of a network cell. A UE being served by the two TRPs may receive and transmit the signaling from and to the respective TRPs on uncorrelated channels. Accordingly, gains in channel diversity may be optimally utilized.

For instance, multi-TRP may be categorized into two high-level categories. Namely, the distinction between the categories may be made with respect to the backhaul type of the backhaul link between two given TRPs.

On the one hand, an ideal backhaul is a very high throughput and very low latency backhaul such as dedicated point-to-point connection using, e.g., optical fiber. An ideal backhaul is assumed to allow for communication between the TRPs with approximately or almost 0 ms delay (e.g., for LTE-A, technical report 3GPP TR 36.932 V15.0.0 (2018-06) mentions in section 6.1.3 a one-way latency of less the 2.5 us wherein, however, propagation delay in the fiber/cable is not included).

On the other hand, a non-ideal backhaul is a backhaul such as DSL, microwave, and other backhauls like relaying, and may for example involve finite (one-way) delays in the range of 2 ms or 5 ms for communication between the two given TRPs.

Apart from the categorization into ideal backhauls and non-ideal backhauls, a further categorization in multi-TRP MIMO technology may be made with respect to how (central) baseband units are shared between TRPs.

For instance, while there are different RF (radio frequency) units for each of two given TRPs, the TRPs may share the same baseband unit. Therein, the link between the RF units and the baseband unit may be ideal or non-ideal. Alternatively, there may be both different (central) baseband units and different RF units for each TRP. Therein, the respective links between baseband units and RF units as well as the link between the different baseband units may be ideal or non-ideal.

The present disclosure relates to time-domain resource assignment for transmission (in particular PDSCH repetitions) from multiple TRPs. In general, using a single-DCI based scheduling from one of the TRPs, repetitions of PDSCH from multiple TRPs may be scheduled.

Figure 11:
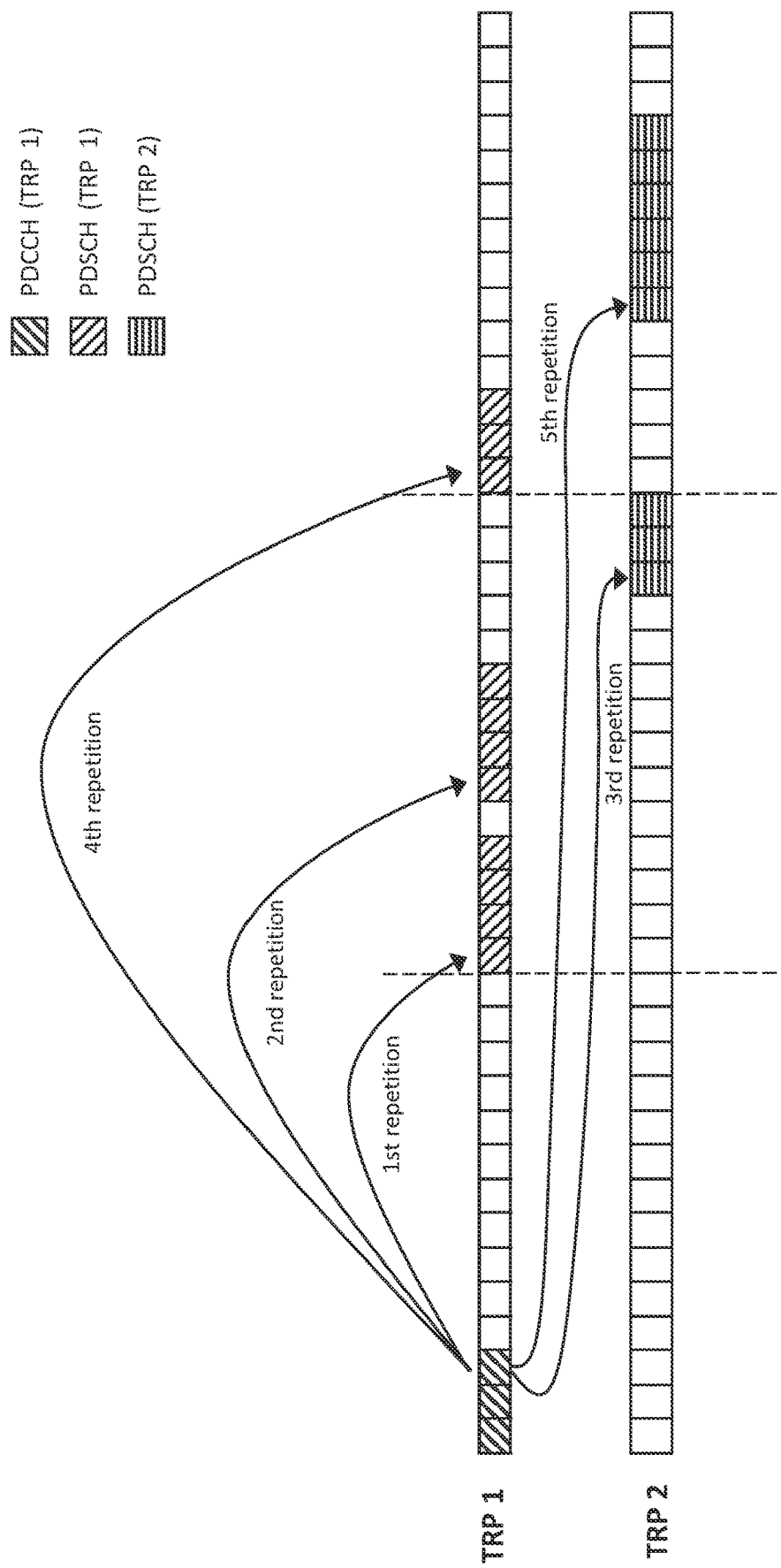
FIG. 11 is a schematic drawing illustrating a first example of time-domain resources of multiple TRPs.

An example of such a PDSCH repetition is shown in FIG. 11. As can be seen, a single DCI (PDCCH) from TRP 1 is scheduling 5 PDSCH repetitions. More specifically, three PDSCH repetitions are scheduled from TRP 1 (i.e., the first, the second, and the forth repetition) and two are scheduled form TRP 2 (i.e., the third repetition and the fifth repetition). Both inter-slot and intra-slot repetitions are supported, and ideal backhaul is considered between multiple TRPs.

It is noted that each TRP can be associated with a separate TCI state, and TCI state and TRP can be used interchangeably. In particular, in the following, TCI state 1 may be referred to as TRP 1, and TCI state 2 may be referred to as TRP 2 and so on.

However, there are several issues with scheduling and associating repetitions when multiple TRPs are scheduled. More specifically, in order to schedule repetitions of a PDSCH from multiple TRPs by single DCI from one of the TRPs, following are the open issues for time-domain resource allocation:

Firstly, it has to be indicated to the UE which repetitions are associated with which TRPs. For example, the UE in FIG. 12 has to know that TRP 1 transmits the first, the second, and the forth repetition, whereas TRP 2 transmits the third and the fifth repetition.

Secondly, the time domain resources for each repetition have to be indicated to the UE. For example, the UE in FIG. 12 has to know the starting symbol, slot and length of each repetition of the five repetitions.

Thirdly, the number of transmissions to be scheduled from each TRP and the combined total number of the transmissions from all TRPs has to be indicated to the UE. For instance, the UE in FIG. 12 has to know that the total number of transmissions to be scheduled is five, where three are from TRP 1 and two are from TRP 2.

In general, regarding association of a repetition to one of the TRPs, semi-static or dynamic indications to the UE are possible. For semi-static association, some pattern on which repetition is association with which TRP may be fixed. However, such an approach may offer not sufficient flexibility to apply the association depending up on the availability of TRPs and/or corresponding time-domain resources.

A dynamic association may be indicated by DCI. However, if explicit indication in form of a bitmap is used, then the size of the bitmap may increase proportionally with increasing number of repetitions and/or TRPs.

Figure 7:
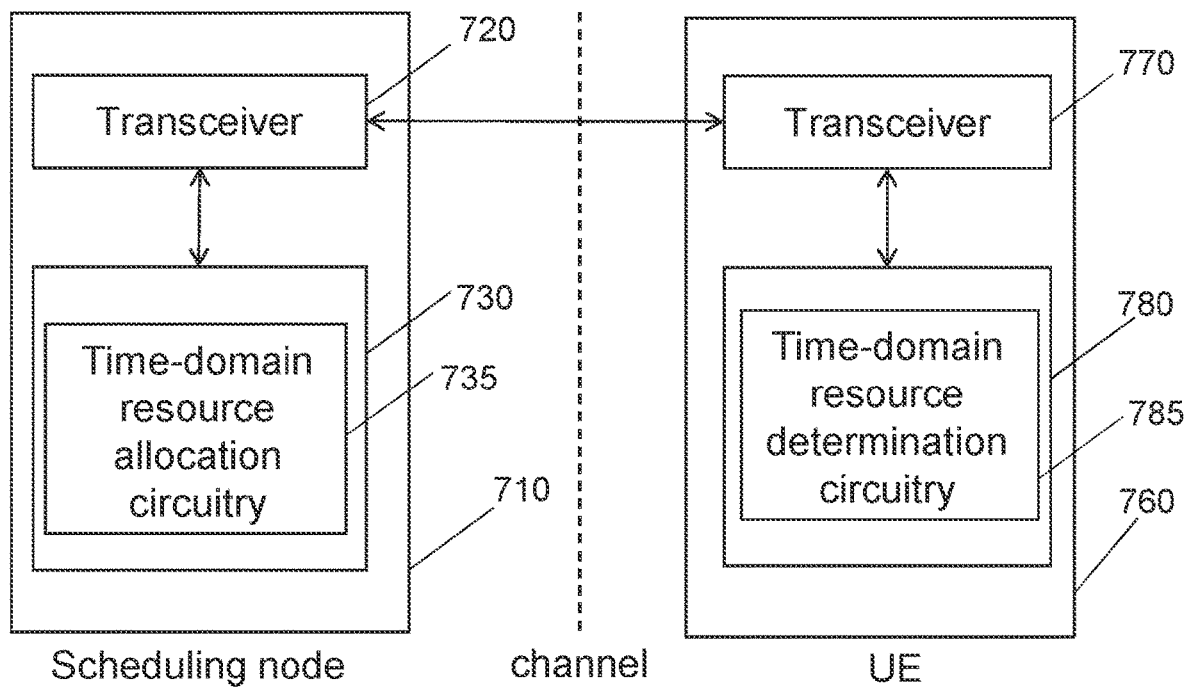
FIG. 7 is a block diagram which shows a user equipment (UE) and a scheduling node (base station) communicating over a channel.

An exemplary UE according to an embodiment is illustrated in FIG. 7. According to the embodiment, the user equipment 760, UE, is provided which comprises a transceiver 770. The transceiver 770 in operation receives downlink control information, DCI, signaling. The UE may further comprise a processor (or processing circuitry) 780 which, in operation, obtains from the DCI signaling a Transmission Configuration Indication, TCI, indicator specifying that two or more TCI states are configured. Furthermore, the processor 780 may obtain, in operation, an indication indicating time-domain resources for transmissions and associations of the time-domain resources with the two or more TCI states. Advantageously, each of the time-domain resources is associated with one of the two or more TCI states. The transceiver may further, in operation, receive or transmit, for each of the two or more TCI states, data on the time-domain resources associated with the respective TCI state.

The circuitry 780 may implement more functionality than the above-mentioned determination of the time-domain resources for the transmission/reception employing more than one TRPs. Thus, the circuitry 780 is considered to include time-domain resource determination circuitry 785 which is configured to perform the time-domain resource determination. The configuration may be provided by hardware adaption and/or by software.

Figure 8:
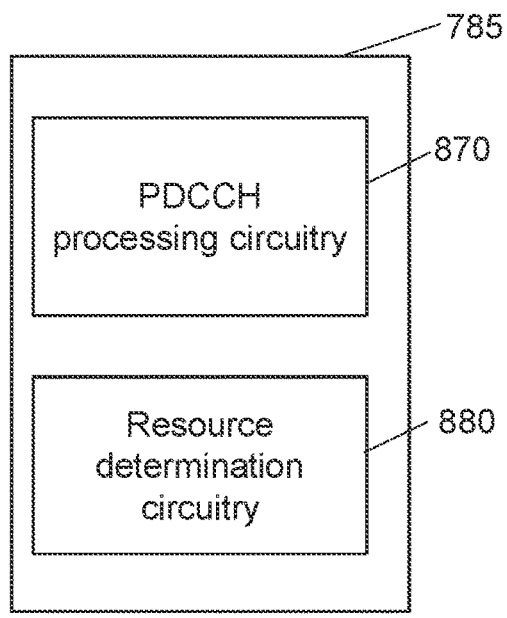
FIG. 8 is a block diagram which shows a processing circuitry portion of a user equipment (UE)

FIG. 8 shows functional structure of the time-domain resource determination circuitry 785. In particular, the time-domain resource determination circuitry 785 includes a PDCCH processing circuitry 870, which obtains from the DCI the TCI indicator and an indication indicating the time-domain resources for transmissions, as well as associations of the time-domain resources with the respective TCI states. The time-domain resource determination circuitry 785 further comprises the resource determination circuitry 880, which based on the time-domain resource indication, when the TCI indicator indicates two or more TCI states, determines allocation of the time-domain resources for the respective TCI states. The processing circuitry 780 may then control the transceiver 770 to receive or transmit data on the determined resources.

According to another embodiment, a base station 710 (scheduling node) is provided which comprises a processor 730. The processor 730, in operation, generates downlink control information, DCI, signaling, which indicates a Transmission Configuration Indication, TCI, indicator specifying that two or more TCI states are configured. The TCI signaling further indicates time-domain resources for transmissions and associations of the time-domain resources with the two or more TCI states, wherein each of the time-domain resources is associated with one of the two or more TCI states. The base station further comprises a transceiver 720 which, in operation, transmits the DCI signaling. The transceiver, in operation, further receives or transmits (e.g., to the UE 760), for each of the two or more TCI states, data on the time-domain resources associated with the respective TCI state. Similarly to the processor 780 in the UE, the processor 730 may also perform various different tasks. The time-domain resource allocation circuitry 735 here denotes a functional part of the processor 730, which performs the above-mentioned time-domain allocation tasks including determining the resources and providing the corresponding signaling to the UE 760.

The scheduling device may further include, as a part of the circuitry 730, an allocation circuitry which performs scheduling of one UE or a plurality of UEs. As a result of the scheduling, the time-domain resource assignment is generated and the corresponding DCI signaling is generated, indicating the TCI indicator and the resource assignment as well as the associations of the resources with the TCI states. The circuitry then controls the transceiver 720 to transmit or receive the data in the scheduled resources for the one or more UEs.

Figure 9:
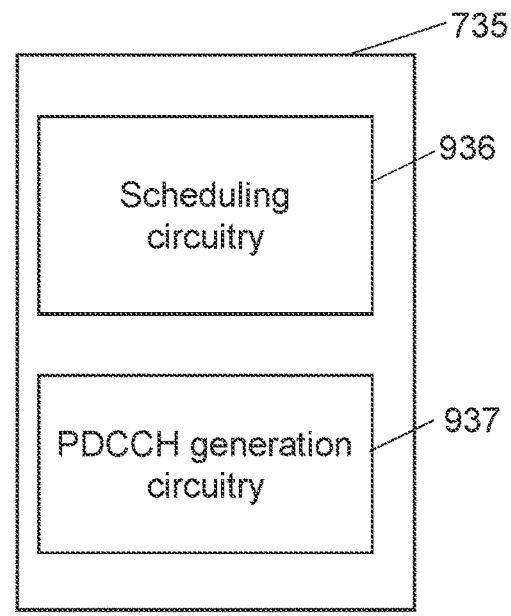
FIG. 9 is a block diagram which shows a processing circuitry portion of a base station.

An exemplary functional structure of the time-domain resource allocation circuitry 735 is shown in FIG. 9. In particular, the time-domain resource allocation circuitry 735 may comprise a scheduling circuitry 936 and a PDCCH generating circuitry 937. The scheduling circuitry 920 performs the scheduling, e.g., collects measurements from the one or more of the UEs and based thereon, based on the requests from the UEs and/or based on the availability of its resources, assigns to the respective UEs the resources in the time domain (and possibly also in the frequency domain, as well as the TRPs). The PDCCH generating circuitry 930 then generates the DCI including the TCI indicator and the resource assignment as well as associations of the time-domain resources with the TCI states in accordance with the scheduling result for the respective one or more UEs.

As can be seen in FIG. 7, the UE 760 and the scheduling nose 710 can form a communication system, i.e., can be capable of communicating over the channel 750.

In general, the DCI signaling may be one bit-field (e.g., a time-domain resource assignment (TDRA) field) of a single DCI. The DCI signaling may be configured to indicate the time-domain resources of the first data transmission (e.g., the first transmission indicated by said DCI signaling), as well as the association of the time-domain resources of the first data transmission to one of the two or more TCI states. The DCI signaling may further indicate the time-domain resources of further data transmissions (e.g., repetitions of the first data transmission) and each of their association to one of the two or more TCI states. In other words, a bit-field of the DCI signaling may jointly indicate the time-domain resources of multiple (e.g., two or more) transmissions and the associations of said time-domain resources with the two or more TCI states.

It is noted that the further data transmissions may be associated with either a same or a different TCI state than the TCI state associated with the first data transmission. In other words, the two or more transmissions may be associated with either a same or a different TCI state of the two or more TCI states.

Furthermore, in general, there may be configured TCI states with which no time-domain resources (of the time domain-resources indicated by the DCI signaling) are associated. However, advantageously, there are two or more configured TCI states with which time-domain resources are associated. In other words, advantageously, two or more of the time domain resources are associated with (mutually) different TCI states.

Furthermore, advantageously, each of the time-domain resources may be associated with a single TCI state of the two or more TCI states. In other words, the indication/DCI signaling may indicate, for each time-domain resource, only a single association that associates the time-domain resource with a single TCI state of the two or more TCI states.

It is also noted that, in general, the further transmissions may be repetition, i.e., imply transmission of a same transport block (TB) as transmitted by the first transmission. However, the present disclosure is not limited thereto, and the further transmission may be transmissions of TBs different from the TB of the first transmission. In other words, the present disclosure can be directly (and in the same way) applied to repetitions of the same as well as to transmissions of different TBs. Thus, in general, the TBs of all transmissions may be mutually different; the TBs of some transmissions may be mutually different, while the TBs of other transmissions are the same; or the TBs of all (first and further) transmissions may be the same. Thus, in general, the terms "transmission" and "repetition" are used interchangeably.

It is further noted that the present disclosure is applicable to any number of Transmission Reception Points (TRPs) and/or applicable to any number of TCI states. In other words, the examples explicitly described in the following are refer only for sake of simplicity to simple cases of only two TRPs/TCI states. It is also noted that each TRP may be associated with/correspond to a respective TCI state and vice versa, so that the terms "TRP" and "TCI state" are employed interchangeably in this disclosure.

In general, the processor may obtain the TCI indicator and indication by parsing the DCI signaling, based on the syntax and semantic defined, e.g., by standard and/or possibly at least in part configurable by the network.

In particular, using one bit-field of a single DCI, the time-domain resources for each transmissions, the association of each transmission to one of the indicated TCI states, the total number of transmissions associated with each of the indicated TCI state, the number of TCI states (TRPs) to be actually used for transmission, and/or the total number of repetitions across all TRPs may be either indicated explicitly or determined based on implicit indication.

In some embodiments, the indication, which the UE obtains from the DCI signaling, is an index indicating an entry of a Time-Domain Resource Assignment, TDRA, table.

In general, an entry of a TDRA table typically corresponds to a row of the TDRA table. However, the any other definition of TDRA table, e.g., with an entry in a column is also possible. The DCI signaling may comprise an indication of a DCI index (in the following also referred to as DCI index). In other words, in general, the DCI signaling may indicate an entry of a TDRA table by indicating the index of the respective row/column. This DCI index may, in general, be indicated/signaled in the DCI signaling by a codepoint. It is noted that, in the following, the terms "row" and "entry" of a TDRA are used interchangeably.

Furthermore, in general, an UE may be configured with more than one TDRA tables. The employment of the TDRA tables is there to be synchronized with the base station For example, the base station will signal to the UE which TDRA table is to be applied. Alternatively, in some scenarios, the UE and the base station may implicitly and in the same way derive which TDRA table is to be used based on other parameters known to both.

In general, the more explicit and larger the information, the more is the flexibility for resource allocation and association, but also possibly more could be the signaling overhead.

In some embodiments, the entry of the TDRA table includes two or more sets (or groups) of Start and Length Indicator Values, SLIVs. Advantageously, each set corresponds to a respective TCI state, and each SLIV corresponds to a respective transmission and indicates a start position and a length of time-domain resources for the respective transmission. The time-domain resources for said respective transmission may be associated with that TCI state that corresponds to the set of the respective SLIV (e.g., the SLIV indicating its time-domain resources).

In general, an entry of a TDRA table may include or indicate one or more SLIV values. A SLIV indicates or specifies time-domain resources, e.g., by indicating/specifying the start position and length of said time-domain resources. In particular, a SLIV may correspond to an ordered pair of two numbers (in particular, integers), one of which indicating the start position of time-domain resources and the other indicating the length of said time-domain resources. In general, a SLIV may indicate the time-domain resources for a single transmission/repetitions, and each the time-domain resources for a transmission/repetitions may be indicated by a single SLIV.

In general, each SLIV in a TDRA table may be associated with or correspond to a respective TCI state. In particular, each SLIV may correspond to only a single TCI state. On the other hand, an entry may indicate zero, one, or more than one SLIV for one TCI state. In other words, an entry may include or indicate, for each TCI states of the two or more TCI states (e.g., the configured TCI states), a set of SLIVs. However, each SLIV may be in only single SLIV group, here also referred to as "the" group of the SLIV. These sets may be empty, may include only a single SLIV, or may include more than one SLIV. The time-domain resources indicated by a SLIV are then associated with the same TCI state as the respective SLIV (i.e., the SLIV that indicates said time-domain resources).

Regarding this, it is also noted that the terms "group," "set" and "groupings" of SLIVs are used interchangeably.

It is noted that an entry of a TDRA in general may further include or indicate a Physical Downlink Shared Channel (PDSCH) mapping type, and, e.g., a $K_2$ value. A $K_2$ value indicates the slot offsets of the start position(s) that are indicated by the SLIV(s) of the same TDRA entry. It is noted that the indication of the PDSCH mapping type and the signaling of the slot offset $K_2$ is not necessary for the present disclosure. Said slot offset may be with respect to the slot of the DCI signaling that indicated the entry of the TDRA table. Furthermore, for inter-slot repetition, one or more entries of a TDRA table may include multiple values of K2.

An example of a TDRA table according to the present embodiment is shown in TDRA Table 1 below.

TABLE 1

| | | | TDRA | |
|---|---|---|---|---|
| DCI index | PDSCH mapping type | K2 | SLIV group 1 (TCI state 1) | SLIV group 2 (TCI state 2) |
| 0 | B | K2-0 | SLIV1-0-1, SLIV1-0-2 | SLIV2-0-1, SLIV2-0-2 |
| 1 | B | K2-1 | SLIV1-1-1, SLIV1-1-2 | SLIV2-1-1 |
| 2 | B | K2-2 | SLIV1-2-1, | SLIV2-1-2, SLIV2-2 |
| ... | ... | ... | ... | ... |
| 15 | B | K2-15 | SLIV1-15-1, SLIV1-15-2 | — |

As can be seen, TDRA Table 1 indicates, for each value of the DCI index, two groups of time-domain resources (SLIVs), more specifically: the fourth column indicates the SLIV group 1, and the fifth column indicates the SLIV group 2. However, in general, a TDRA table may indicate, for each value of the DCI index, more than two groups of SLIVs.

As can be seen, in TDRA Table 1, each group is associated with one of the TCI states. More specifically, in the present example, SLIV group 1 corresponds to the TCI state 1, and SLIV group 2 corresponds to the TCI state 2. In general, a TDRA table may indicate more groups, each associated with a TCI state. In general, the groups may correspond to mutually different TCI states. However, the present disclosure is not limited thereto and some of the groups may be associated with a same TCI state.

In general, each group may have multiple time-domain resources (SLIVs) that correspond to all the repetitions associated with the respective TCI state. However, the present disclosure is not limited thereto and some of the groups may include zero or only a single SLIV.

In the example shown in TDRA Table 1, a DCI index value of 0 indicates two SLIVs for SLIV group 1, namely SLIV1-0-1 and SLIV1-0-2, and two SLIVs for SLIV group 2, namely SLIV2-0-1 and SLIV2-0-2. A DCI index value of 1, on the other hand, indicates two SLIVs for SLIV group 1, namely SLIV1-1-1 and SLIV1-1-2, but only one SLIV for SLIV group 2, namely SLIV2-1-2. Thus, in general, in each SLIV group there may be any number of SLIVs, independently from the number of SLIVs in other SLIV groups and/or other in SLIV groups for other DCI indices. In particular, the number of SLIVs in a SLIV group may be zero.

In general, based on an TDRA table that is of the general form of TDRA Table 1 and an indicated index indicated in DCI (or, in other words, based on an entry as shown in TDRA Table 1), the time-domain resources for each repetition may be determined as follows: Each SLIV is mapped one-to-one to each repetition in order to determine the starting symbol and length within the slot with offset K2 from the scheduling PDCCH (e.g., from the slot of the DCI signaling indicating the entry with said offset K2). Sequence of SLIVs from all the groups is determined by increasing order of their starting symbol value.

Furthermore, based on TDRA Table 1 (in particular, based on the entry of said TDRA table that is indicated by DCI index indicated in the DCI signaling), association of each repetition to one of the indicated/configured TCI states is determined based on the groups. More specifically, based on the SLIV groups, each repetition (or each time-domain resource) is associated with one of the indicated TRPs/TCI states.

If there is a group, but no SLIV is indicated within that group, then it means that no transmission from the TRP is associated with that group. For instance, in TDRA Table 1, for SLIV group 2 and DCI index=15, there is no SLIV indicated.

Furthermore, based on the TDRA Table 1, the total number of repetitions associated with each of the configured TCI state may be determined by the number of SLIVs within a given group. In other words, for each entry, the total number of repetitions associated with a TCI state may be determined by counting the SLIVs in said TCI group of said entry. For instance, in TDRA Table 1, for SLIV group 2, the total number of repetitions is 2, 1, 2, and 0 for DCI indices 0, 1, 2, and 15, respectively. Furthermore, based on the TDRA table, the number of TCI states (or TRPs) to be actually used for transmission may be determined by the number of groups within the entry indicated by the DCI index that have at least one SLIV indicated. In other words, for a given entry, the number of TCI states to be actually used may be determined by counting the TCI groups of said entry that have at least one SLIV specified.

Furthermore, based on the TDRA Table 1, the total number of repetitions across all TRPs may be determined by the total number of SLIVs across all the groups. For instance, in TDRA Table 1, the total number of repetitions is 4, 3, 3, and 2 for DCI indices 0, 1, 2, and 15, respectively.

A more explicit example of a TDRA Table 1 according to the present embodiment is shown in TDRA Table 2 below.

TABLE 2

| | | | TDRA | |
|---|---|---|---|---|
| DCI index | PDSCH mapping type | K2 | SLIV group 1 (TCI state 1) | SLIV group 2 (TCI state 2) |
| 0 | B | 1 | {0, 3}, {4, 2}, {12, 2} | {8, 4} |
| 1 | B | 2 | {0, 2}, {2, 2} | — |

Figure 12:
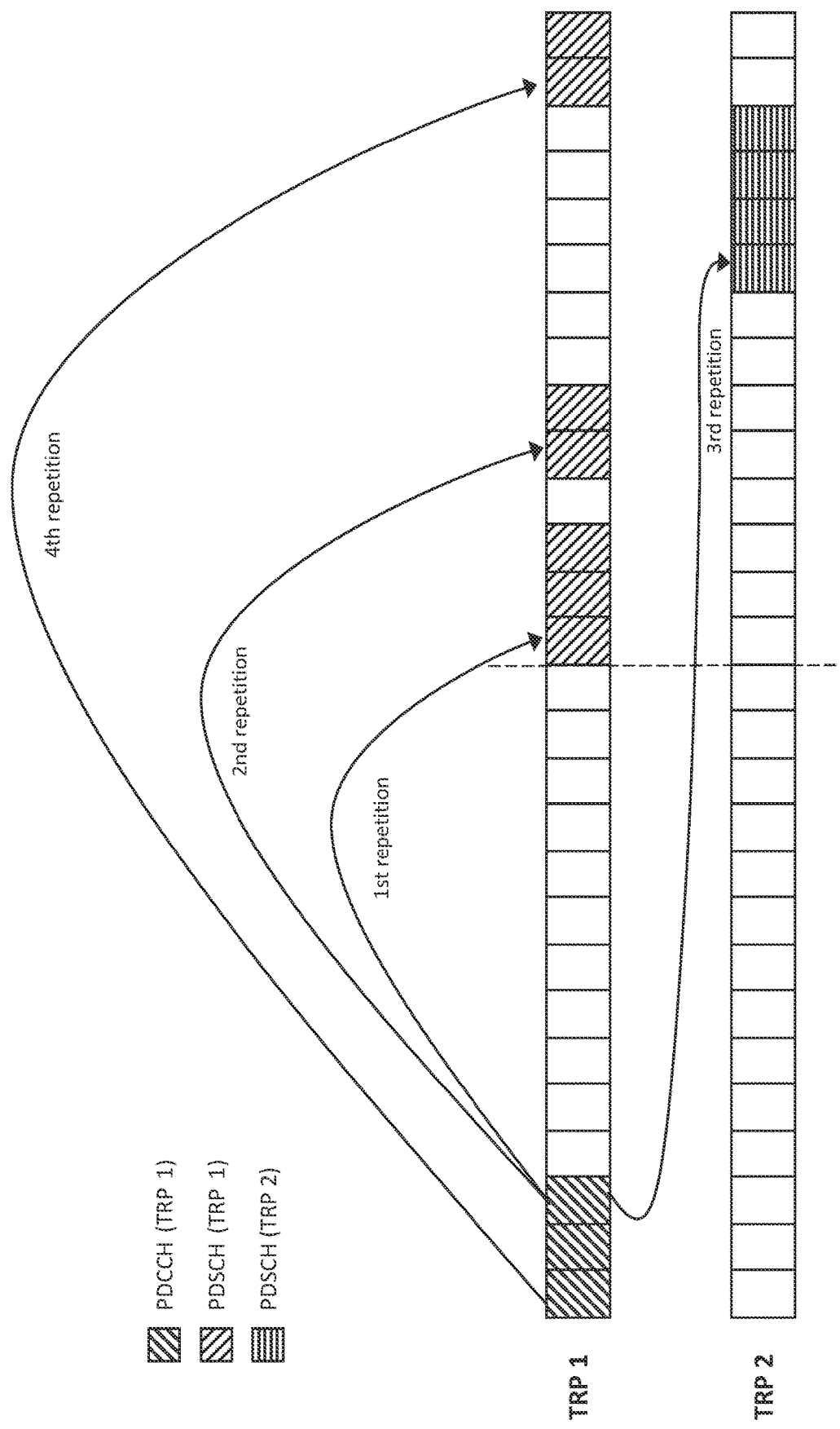
FIG. 12 is a schematic drawing illustrating a second example of time-domain resources of multiple TRPs.

If DCI index 0 of TDRA Table 2 is indicated to the UE, then the time-domain resource allocation and association to TRPs will be as shown in FIG. 12.

In particular, the slot offset for starting the transmission is "1" slot after the DCI signaling (scheduling PDCCH). More specifically, a slot offset of "1" implies that the start position of the time-domain resources indicated by the SLIVs are specified with respect to the first slot after the DCI signaling. Here, in general, "the" DCI signaling is that DCI signaling that indicated the entry with said slot offset.

As can be seen, there are 3 SLIVs for SLIV group 1, namely "{0,3}," "{4,2}," "{12,2}," and 1 SLIV for SLIV group 2, namely "{8,4}," where each SLIV is represented in the general form "{start position of time-domain resources, length of time-domain resources}." Thus, based on the starting symbol indices of the SLIVs in the first entry of TDRA Table 2 (corresponding to the second row in TDRA Table 2, with DCI index 0, which is the convention henceforth adopted), the sequence of repetitions is "{0,3}," "{4, 2}," "{8,4}," "{12,2}." Thus, in total, there are 4 repetitions across TRP 1 (TCI state 1) and TRP 2 (TCI state 2).

Furthermore, based on the grouping shown in the first entry of table, the 1st, 2nd, and 4th repetitions are repetitions are associated with TCI state 1 and, thus, from TRP 1; whereas the 3rd repetition is associated with TCI state 2 and, thus, from TRP 2. Thus, there are 3 repetitions from TRP 1, and 1 repetition from TRP 2.

All of this is also illustrated in FIG. 12. To be explicit, the time-domain resources of the first transmission/repetition are the first 3 symbols of TRP 1 (e.g., with index 0, 1, and 2) in the first slot after the DCI signaling. The time-domain resources of the second repetition are the symbols with index 4 and 5 of TRP 1 in the first slot after the DCI signaling. The time-domain resources of the third repetition are the symbols with index 8, 9, 10, and 11 of TRP 2 in the first slot after the DCI signaling, and the time-domain resources of the forth repetition are the symbols with index 12 and 13 of TRP 1 in the first slot after the DCI signaling.

The present embodiment (e.g., a TDRA table of the form of TDRA Table 2) provides complete flexibility to have any specific SLIV value for each transmission, any order of TCI state association and allocating an unequal number of repetitions to different TCI states.

In an exemplary implementation, each set includes not more than one SLIV, and the entry of the TDRA table includes an indication of the total number of the transmissions (e.g., the total number of the transmissions that are scheduled/indicated, explicitly or implicitly, by this entry).

In these embodiments, each group can have only up to a single time-domain resources (SLIVs) that correspond to the first transmission associated with the respective TCI state. Furthermore, each entry of the TDRA table may indicate a total number of repetitions. Here, the total number of transmissions indicates the total number of transmissions scheduled by this entry (the entry that also indicates said total number) of the TDRA table.

It is noted that the total number of the SLIVs indicated by an entry (e.g., by an entry of TDRA table 2) already implicitly indicates a total number of transmissions. This implicit number may be obtained by simply counting the explicitly indicated SLIVs. However, an entry may indicate the total number of transmissions explicitly and/or separately from the aforementioned implicit indication by the number of the SLIVs. Thus, in general, the total number of transmissions indicated by an entry may be different (e.g., larger) than the total number of SLIVs explicitly indicated by that entry. Consequently, such an entry implicitly indicates the existence of transmissions other than the transmissions explicitly indicates by the SLIVs of that entry.

In some embodiments, the processor of the UE, in operation, determines, for each set including one SLIV, in accordance with that SLIV (i.e., the one SLIV) included in the set, a start position and a length of the time-domain resources for the respective first transmission of the set (e.g., the first transmission with the TCI state corresponding to the set). Alternatively or in addition, the processor, in operation, may determine, for each transmission that is not one of the first transmissions: i) an association of time-domain resources for the transmission with one of the two or more TCI states in accordance with a pattern, the pattern indicating a sequence of TCI states and corresponds to start positions of the time-domain resources for the first transmissions; ii) a length of the time-domain resources for the transmission in accordance with a length of the time-domain resources for the respective first transmission (the first transmission of the indicated transmissions with the same TCI state as the respective transmission), wherein the time-domain resources for the respective first transmission and the time-domain resources for the transmission are associated with the same TCI state; and/or iii) the start position of the time-domain resources for the transmission in accordance with: an offset, the start position and the length of time-domain resources that are for one of the transmissions preceding the transmission. Here the offset may correspond to (or be determined from/based on) start positions and/or lengths of time-domain resources for at least two first transmissions.

The above determination processing will be illustrated with reference to TDRA Table 3.

TABLE 3

| | | | TDRA | | |
|---|---|---|---|---|---|
| DCI index | PDSCH mapping type | K2 | SLIV 1 (TCI state 1) | SLIV 2 (TCI state 2) | (total) number of repetitions |
| 0 | B | K2-0 | SLIV1-0-1 | SLIV2-0-1 | N-0 |
| 1 | B | K2-1 | SLIV1-1-1 | — | N-1 |
| ... | ... | ... | ... | ... | ... |
| 15 | B | K2-15 | — | SLIV2-15-1 | N-15 |

As can be seen, the sixth column in TDRA Table 3 (explicitly) indicates the total number of repetitions. In general, a TDRA may include a separate column (not necessarily the sixth column), which (explicitly) indicates the total number of repetitions. Based on such a table, the total number of repetitions across all TRPs/TCI states may thus be determined from the explicit indication in said separate column. More generally, an entry of a TDRA table may indicate/include the total number of repetitions across all TRPs/TCI states, and, thus, said total number be determined from the explicit indication.

In general, based on an TDRA table that is of the general form of TDRA Table 3 and an indicated DCI index (or, in other words, based on an entry as shown in TDRA Table 3), the number of TRPs/TCI states to be actually used for transmission may be determined by the number of SLIV groups within the entry (e.g., the entry indicated by the DCI) that have at least one SLIV indicated for that group. In other words, for a given entry, the number of TCI states to be actually used may be determined by counting the TCI groups of said entry that have at least one SLIV specified.

As far as the time-domain resources are concerned, for each TCI group, up to one SLIV can be indicated that corresponds to starting symbol and length of the first repetitions from the associated TRP. As for the first repetitions, the time-domain resources are associated with the TCI state of the TCI group of the SLIV that explicitly specifies said time-domain resources.

Furthermore, if the total number of transmissions that is larger than the number of TCI states to be actually used, there are further/subsequent repetitions which are not explicitly specified by a SLIV in the entry of the TDRA. Here, the number of these further/subsequent transmissions may correspond to the "total number of transmissions" minus "number of TCI states to be actually used."

The associations of these further repetitions may be determined by distributing them (e.g., evenly) according to a pattern over the actually used TCI sates (e.g., the TCI states for which a first repetitions is specified in the respective TDRA entry). The pattern may predetermined, semi-static, and/or RRC configured. For instance, every alternate repetition may be associated with an alternate TCI state. Alternatively or in addition, subsequent repetitions may be associated with the actually used TCI states in a round-robin manner, e.g., based on the order of the TCI states of the first repetitions. For instance, the order of the first repetitions may be cyclically repeated. In general, the pattern may be predetermined of may be derived from the SLIVs of the first repetitions, in particular, from the order of the TCI states of the first repetitions. In general, such a pattern indicates a sequence of configured TCI states.

The start position (also referred to as starting symbol) of time-domain resources (SLIVs) for subsequent repetitions are determined as follows. The starting symbol for each repetition may, for instance, be determined by a symbol offset between the starting and/or end symbols of the SLIVs from different SLIV groups. Alternatively, the value of the offset may be predetermined, semi-static, and/or RRC configured. For instance, the offset may be set to 1, which corresponds to a continuous allocation of resources.

The symbol offset may be calculated from the indicated SLIVs, in particular, by subtracting the start/end positions (the end position may be start position plus length) of time-domain resources explicitly indicated by two (different) SLIVs.

The symbol offset may then be added to the start/end position of the time-domain resources of one repetitions to obtain the start/end position of the time-domain resources of a subsequent (e.g., the consecutive) repetitions. It is also noted that, in general, the time-domain resources of all subsequent transmissions may be determined based on the same symbol offset. Alternatively, for each subsequent repetition, a different symbol offset may be used.

The length of time-domain resources of subsequent/further repetitions (e.g., a repetitions than is not a first repetitions) may be based on the length of the time-domain resources of the first repetitions. In particular, the length of a subsequent transmission may be based on the length of that first transmission that is in the same group as said subsequent transmission. For instance, subsequent repetition lengths may be the same as the length of the respective first repetitions of the corresponding group.

Furthermore, the total number of repetitions associated with each of the configured TCI states may be determined by dividing the total number of repetitions, which is explicitly specified, by the number of TCI states actually used for transmission. Alternatively, for each entry, the total number of repetitions associated with a TCI state may be determined by counting the SLIVs in said TCI group of said entry.

This design option is less flexible, but would require smaller size table and lower DCI overhead to indicate the row of the table.

A more explicit example of a TDRA Table 3 according to the present embodiment is shown in TDRA Table 4.

TABLE 4

| | | TDRA | | | |
|---|---|---|---|---|---|
| DCI index | PDSCH mapping type | K2 | SLIV 1 (TCI state 1) | SLIV 2 (TCI state 2) | (total) number of repetitions |
| 0 | B | 1 | {0, 3} | {5, 3} | 3 |
| 1 | B | K2-1 | {0, 4} | — | 3 |

Figure 13:
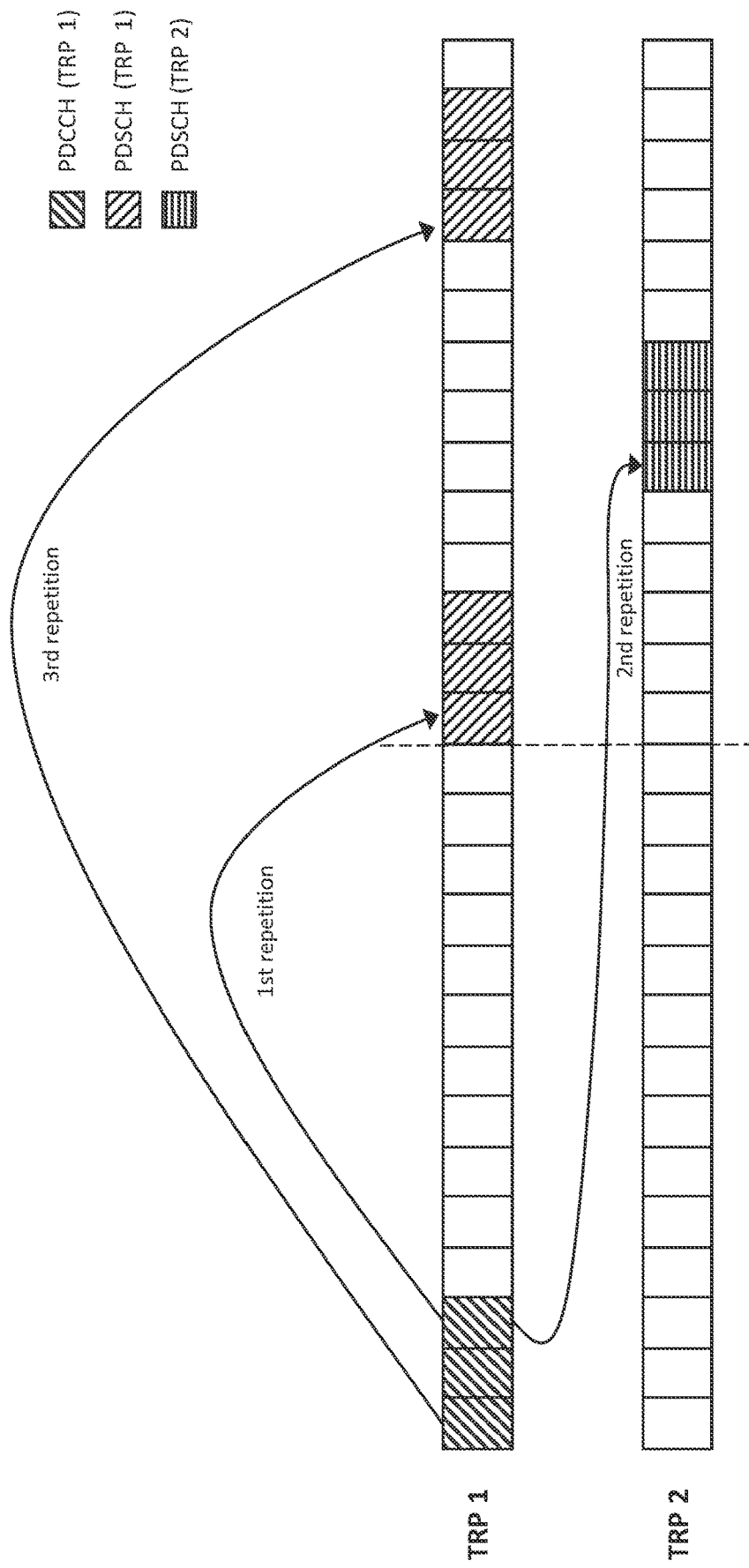
FIG. 13 is a schematic drawing illustrating a third example of time-domain resources of multiple TRPs.

If DCI index 0 of the TDRA Table 4 is indicated to the UE, then the time-domain resource allocation and association to TRPs will be as shown in FIG. 13 corresponding to an intra-slot scheduling.

In particular, the K2 in the first entry is indicated to be "1," and, thus, the slot offset for starting the transmission is "1" slot after the scheduling PDCCH. Based on SLIV 1, "{0,3}," the first repetition is from TRP 1 and will start at symbol #0 and span 3 symbols. In other words, the time-domain resources of the first repetition are the symbols with index #0, #1, and #2. Furthermore, based on SLIV 2, "{5,3}," the first repetition is from TRP 2 (overall second repetition) and will start at symbol #5 and span 3 symbols (i.e., symbols #5, #6, and #7). The symbol offset between repetitions is calculated as 3 (difference between the first symbols index of SLIV 2, #5, and the last symbol index of SLIV 1, #3).

Since the total number of repetitions is indicated as "3," there is one subsequent repetition (overall third repetition). In the present example, since the association of the repetitions follows an alternating pattern and the second repetitions is from TRP 2, the third repetition will be from TRP 1. Furthermore, based on the symbol offset "3" and the index of last symbol of the second repetition "7," the index of the starting symbol of the third repetition will be #10. The length of the third repetition will be the same as the length of the first repetition, for the first repetition uses the same TRP as the third repetition. Consequently, the third repetition will span 3 symbols (i.e., symbols #10, #11, and #12).

Another explicit example of a TDRA table 3 according to the present embodiment is shown in TDRA Table 5.

TABLE 5

| DCI index | PDSCH mapping type | K2 | SLIV 1 (TCI state 1) | SLIV 2 (TCI state 2) | (total) number of repetitions |
|---|---|---|---|---|---|
| 0 | B | 1 | {0, 3} | {5, 3} | 4 |

Figure 14:
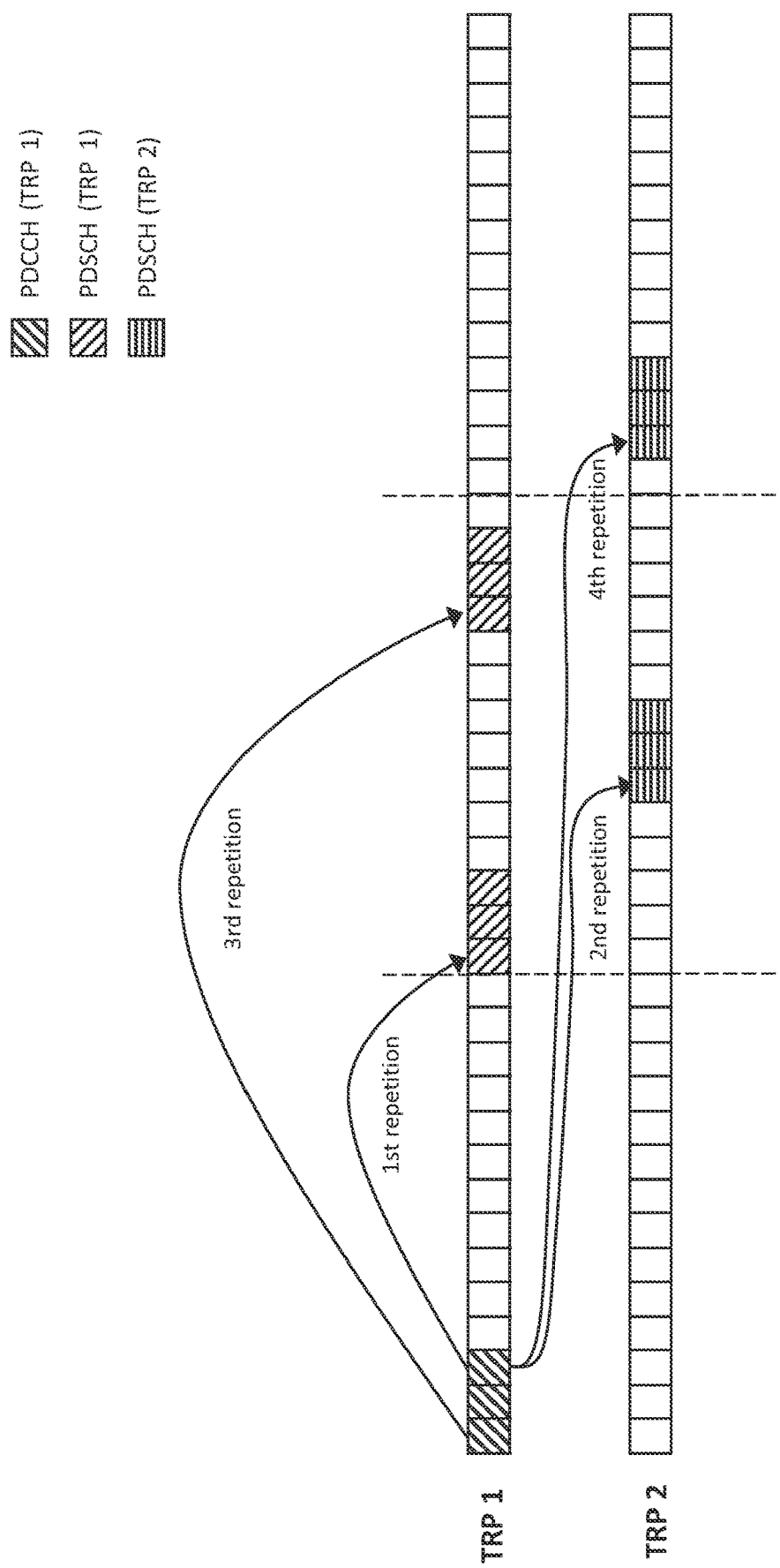
FIG. 14 is a schematic drawing illustrating a fourth example of time-domain resources of multiple TRPs.

If DCI index 0 of TDRA Table 5 is indicated to the UE, then the time-domain resource allocation and association to TRPs will be as shown in FIG. 14 corresponding to a combination of inter and intra slot scheduling.

As can be seen, the entry for DCI index 0 of TDRA Table 5 differs from the entry for DCI index 0 of TDRA Table 4 only in that the total number of repetitions is indicated to be "4" (instead of "3" as indicated by TDRA Table 4). Therefore, the time-domain resources of the first, the second, and the third repetition are same as in the case of TDRA Table 4, and, for the sake of simplicity, the corresponding description is not repeated.

However, in the case of TDRA Table 5, there is an additional subsequent repetition (overall forth repetition). In the present example, since the association of the repetitions follows an alternating pattern and the third repetitions is from TRP 1, this forth repetitions will be from TRP 2. Furthermore, based on the symbol offset "3" and the index of last symbol of the third repetition "12," the index of the starting symbol of the third repetition would be #15. However, in the present example, the total number of symbols in each slot is only 14 (i.e., slots #0 to #13). The third repetition thus starts in the second slot after the scheduling PDCCH at symbol position #1, which is calculated by subtracting 14 from 15.

The length of the forth repetition will be the same as the length of the second repetition, for the second repetition uses the same TRP as the forth repetition. Consequently, the forth repetition will span 3 symbols (i.e., symbols #15, #16, and #17).

The present embodiments (e.g., a TDRA table of the form of TDRA Table 3, 4, or 5), provides the advantage of a smaller sized table and lower DCI overhead to indicate the row/entry of the TDRA table.

In some embodiments the entry of the TDRA table includes an indication of the total number of the transmissions, an indication of an offset between the transmissions, and a single SLIV. The single SLIV indicates the start position of time-domain resources for a first transmission, and the length of the time-domain resources for the first transmission (e.g., for the first transmission indicated, explicitly or implicitly, by the entry).

As illustrated in TDRA Table 6, in some embodiments, each entry of the TDRA table explicitly indicates (only) a single SLIV, a symbol offset, and the total number of repetitions. To be specific, in the example illustrated in TDRA Table 6, column 4, column 5, and column 6 respectively indicate the single SLIV, the symbol offset, and the total number of repetitions.

The time-domain resources indicated by said single SLIV may correspond to the first transmission from the first TCI state. In other words, the single SLIV indicated by the entry may be used to calculate the starting symbol and length of the time-domain resources for the first repetition from the first TCI state. This first TCI state may be predetermined, semi-static, and/or be configured by RRC.

Time-domain resources (SLIVs) for subsequent repetitions may be indicated/determined implicitly and associated with the configured TCI states using a predetermined, semi-static, and/or RRC configured pattern. For instance the subsequent repetitions may be associated with the configured TCI states in a round-robin manner.

TABLE 6

| DCI index | PDSCH mapping type | K2 | SLIV | Symbol offset | (total) number of repetitions |
|---|---|---|---|---|---|
| 0 | B | K2-0 | SLIV-0 | S2-0 | N-0 |
| 1 | B | K2-1 | SLIV-1 | S2-1 | N-1 |
| ... | ... | ... | ... | ... | ... |
| 15 | B | K2-15 | SLIV-15 | S2-15 | N-15 |

In an exemplary implementation, the processor of the UE, in operation, determines the start position of the time-domain resources for the first transmission in accordance with the start position indicated by the single SLIV for the first transmission. Alternatively or in addition, the processor may determine the length of the time-domain resources for the first transmission in accordance with the length indicated by the single SLIV for the first transmission Alternatively or in addition, the processor may determine, for each transmission that is not the first transmission: i) the length of time-domain resources for the transmission in accordance with the length of the time-domain resources for the first transmission; ii) the start position of time-domain resources for the transmission in accordance with: the indication of the offset, and the start position and the length of the time-domain resources for the first transmission; and/or iii) an association of the time-domain resources for the transmission with the two or more TCI states in accordance with a predetermined pattern.

In general, based on an TDRA table that is of the general form of TDRA Table 6 and an indicated DCI index (or, in other words, based on an entry as shown in TDRA Table 6), the number of TRPs/TCI states to be actually used for transmission may be determined by counting all the TCI states indicated by a TCI code-point (i.e., a code-point of the bit-field which may jointly code the TCI indicator together with some further parameters). Furthermore, the total number of repetitions across all TRPs/TCI states is indicated by and, thus, may be determined from the explicit indication in the separate column.

The time-domain resources for the first repetition may be indicated by and, thus, be determined from the single SLIV. In other words, the single SLIV indicated by the entry may be used to calculate the starting symbol and length of the time-domain resources for the first repetition from the first TCI state. This first TCI state may be predetermined, semi-static, and/or be configured by RRC.

Furthermore, if the total number of transmissions that is larger than one, there are further/subsequent repetitions which are not explicitly specified by the SLIV in the entry of the TDRA. Here, the number of these further subsequent transmissions may correspond to the "total number of transmissions" minus "one."

The associations of these further repetitions may be determined by distributing them (e.g., evenly) according to a pattern (e.g., in a round-robin manner) over the actually used TCI sates (e.g., the TCI states indicated by the code-point). The pattern may predetermined, semi-static, and/or RRC configured. For instance, every alternate repetition may be associated with an alternate TCI state, and/or the pattern may indicate a sequence of TCI states, which is cyclically repeated. In general, such a predetermined pattern indicates a sequence of configured TCI states.

The lengths of time-domain resources of subsequent repetitions, e.g., repetitions other than the first repetition, may be determined based on the length of the first repetition. For instance, the lengths of subsequent repetitions may be the same as the length of the first repetition.

The start position (here also referred to as starting symbol) of time-domain resources (SLIVs) for subsequent repetitions may be determined/indicated implicitly using the indicated offset. More specifically, the symbol offset may be added to the start/end position of the time-domain resources of one repetitions to obtain the start/end position of the time-domain resources of a subsequent (e.g., the consecutive) repetitions. It is also noted that, in general, the time-domain resources of all subsequent transmissions may be determined based on the same symbol offset. Alternatively, for each subsequent repetition, a different symbol offset may be used.

Furthermore, the total number of repetitions associated with each of the configured TCI states may be determined by dividing the total number of repetitions, which is explicitly specified, by the number of TCI states actually used for transmission. Alternatively, for each entry, the total number of repetitions associated with a TCI state may be determined by counting the SLIVs in said TCI group of said entry.

A more explicit example of a TDRA table according to the present embodiment is shown in TDRA Table 7.

TABLE 7

| | | | TDRA | | |
|---|---|---|---|---|---|
| DCI index | PDSCH mapping type | K2 | SLIV | Symbol offset | (total) number of repetitions |
| 0 | B | 1 | {0, 3} | 3 | 3 |
| 1 | B | 1 | {0, 5} | 2 | 2 |

Figure 15:
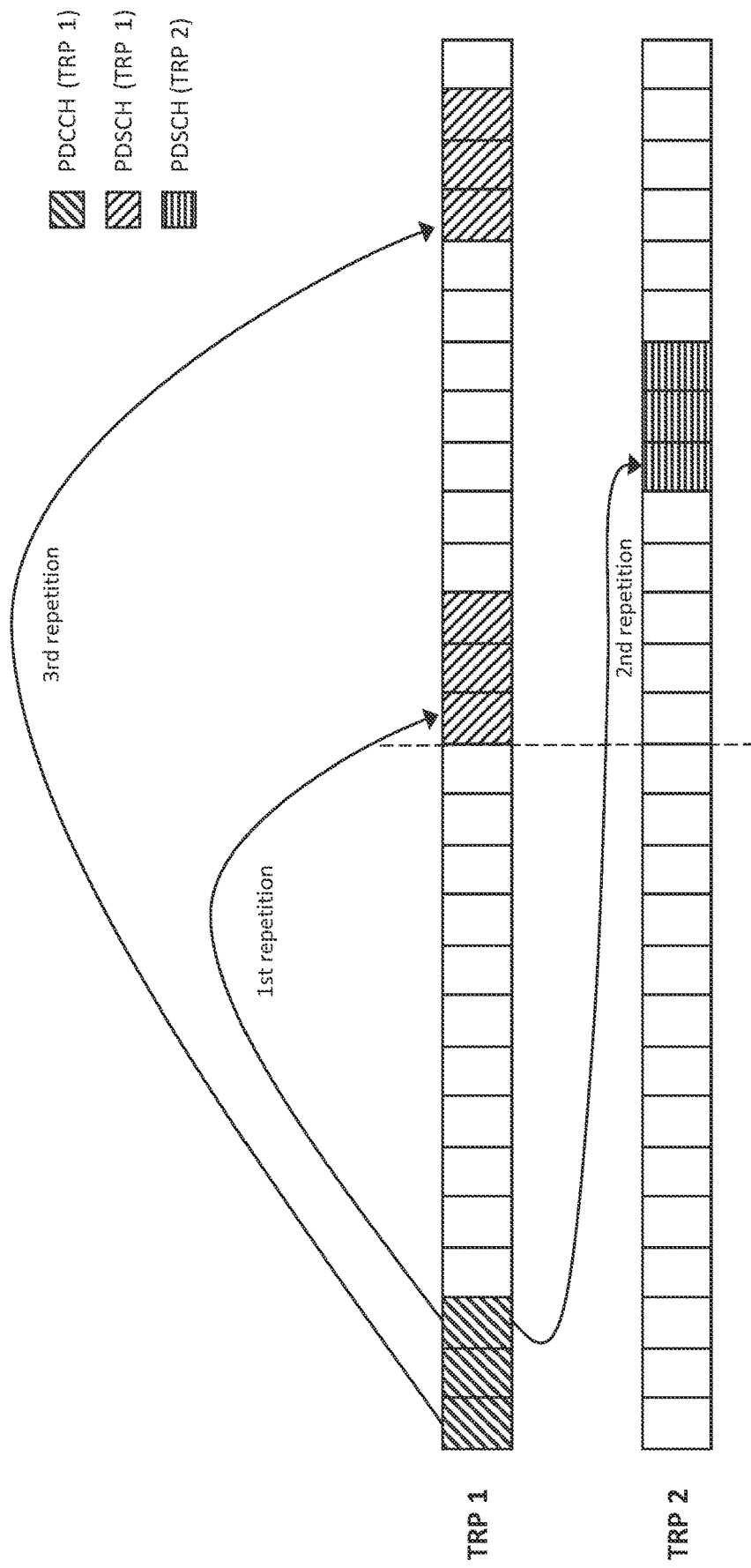
FIG. 15 is a schematic drawing illustrating a fifth example of time-domain resources of multiple TRPs.

If DCI index 0 of the above TDRA Table 7 is indicated to the UE, then the time-domain resource allocation and association to TRPs will be as shown in FIG. 15.

In particular, the K2 in the first entry is indicated to be "1," and, thus, the slot offset for starting the transmission is "1" slot after the scheduling PDCCH.

Based on the single SLIV, "{0,3}," the first repetition is from TRP 1 and will start at symbol #0 and span 3 symbols. In other words, the time-domain resources of the first repetition are the symbols with index #0, #1, and #2.

The total number of repetition is indicated to be "3" and, thus, the associations and time-domain resources of 2 repetitions are indicated implicitly.

In the present example, the association/grouping is based on an alternating pattern and two TCI states are configured. Consequently, the first and third repetitions are from TRP 1, whereas the second repetition is from TRP 2. Thus, the total number of repetition associated with TRP 1 is 2, and the total number of repetition associated with TRP 2 is 1.

Furthermore, based on the indicated offset "3" and the index of the last symbol of the first repetition "2" (in general, the last symbol of a/the previous repetition may be used as reference for the offset), the second repetition will start from symbol #5. In accordance with the length of the first repetition, the length of the second repetitions is 3 symbols. Thus, in summary, the second repetition will be from TRP 2, start from symbol #5, and span 3 symbols (i.e., symbols #5, #6, and #7).

Moreover, based on the indicated offset "3" and the index of the last symbol of the second repetition "7," the third repetition will start from symbol #10. In accordance with the length of the first repetition, the length of the second repetitions is 3 symbols. Thus, in summary, the second repetition will be from TRP 1, start from symbol #10, and span 3 symbols (i.e., symbols #10, #11, and #12).

The present embodiments (e.g., a TDRA table of the form of TDRA Table 6 or 7), provides the advantage of a small TDRA table size and low DCI overhead to indicate the row/entry of the TDRA table in comparison to other tables. In addition, a symbol offset between repetitions allows to accommodate beam switching delay for the UE to receive from one TRP to another: If transmissions with different TCI states are contiguous, a UE might not have sufficient time for beam switching to receive the transmissions from the different TRPs.

In another exemplary implementation, the entry of the TDRA table includes an indication indicating a first SLIV, a second SLIV, and the total number of the transmissions (e.g., the total number of the transmissions that are indicated, explicitly or implicitly, by the entry). Here, the first SLIV may indicate the start position of the time-domain resources for the first transmission, and the length of the time-domain resources for the first transmission; and the second SLIV may indicate the start position of the time-domain resources that are not available for the transmissions, and the length of the time-domain resources that are not available for the transmissions.

As illustrated in TDRA Table 8, in some embodiments, each entry of the TDRA table explicitly indicates first time-domain resources and second time-domain resources (e.g., by means of respective SLIVs), and the total number of repetitions. The TDRA table may further indicate a symbol offset and a PDSCH mapping type for each value of the DCI index. In particular, in the illustrative TDRA Table 8, the columns labelled "SLIV 1" and "SLIV 2" respectively indicate the first and the second time-domain resources.

In general, only one SLIV of the two SLIVs may indicate time-domain resources for transmission, for instance, for the first transmission of the transmissions indicated by the respective entry. In other words, the first time-domain resources (SLIV) may correspond to the first transmission from a first TCI state. This first TCI state may be predetermined, semi-static, and/or be configured by RRC.

Time-domain resources (SLIVs) for subsequent repetitions (or, in general other repetitions than the repetition explicitly indicated by the first SLIV) may then be determined implicitly and associated with the configured TCI states using a predetermined, semi-static, and/or RRC configured pattern. For instance the subsequent repetitions may be associated with the configured TCI states in a round-robin manner.

The other SLIV of the two SLIVs may indicate time-domain resources not available for repetitions. In other words, the second time-domain resource (SLIV) corresponds to the symbols and/or time-domain resources that are not available for data transmission. The time domain-resources for the repetitions, in particular, the time-domain resources for subsequent repetitions may then be determined by taking into account that time-domain resources indicated by the second SLIV are not available for repetitions.

TABLE 8

TDRA

| DCI index | PDSCH mapping type | K2 | SLIV 1 | SLIV 2 | Total number of repetitions |
|---|---|---|---|---|---|
| 0 | B | K2-0 | SLIV1-0 | SLIV2-0 | N-0 |
| 1 | B | K2-1 | SLIV1-1 | SLIV2-1 | N-1 |
| ... | ... | ... | ... | ... | ... |
| 15 | B | K2-15 | SLIV1-15 | SLIV2-15 | N-15 |

In general, based on an TDRA table that is of the general form of TDRA Table 6 and an indicated DCI index (or, in other words, based on an entry as shown in TDRA Table 6), the number of TRPs/TCI states to be actually used for transmission may be determined by counting all the TCI states indicated by a TCI code-point (i.e., a code-point of the bit-field which may jointly code the TCI indicator together with some further parameters). Furthermore, the total number of repetitions across all TRPs/TCI states is indicated by and, thus, may be determined from the explicit indication in the separate column.

The time-domain resources for the first repetition may be indicated by and, thus, be determined from one of the two SLIVs, for instance, from the first SLIV. In other words, the first SLIV indicated by the entry may be used to calculate the starting symbol and length of the time-domain resources for the first repetition from the first TCI state.

Furthermore, if the total number of transmissions that is larger than one, there are further/subsequent repetitions which are not explicitly specified by the SLIV in the entry of the TDRA. Here, the number of these further subsequent transmissions may correspond to the "total number of transmissions" minus "one."

The associations of these further repetitions may be determined by distributing them (e.g., evenly) according to a pattern (e.g., in a round-robin manner) over the actually used TCI sates (e.g., the TCI states indicated by the code-point). The pattern may predetermined, semi-static, and/or RRC configured. For instance, every alternate repetition may be associated with an alternate TCI state. In general, such a predetermined pattern indicates a sequence of configured TCI states.

The lengths of time-domain resources of subsequent repetitions, e.g., repetitions other than the first repetition, may be determined based on the length of the first repetition. For instance, the lengths of subsequent repetitions may be the same as the length of the first repetition.

The start position of time-domain resources (SLIVs) for subsequent repetitions may be determined using an offset. The value of the offset may be predetermined, semi-static, and/or RRC configured. For instance, the offset may be set to 1, which corresponds to a continuous allocation of resources. For instance, if there is no collision with the time resources indicated/determined by the second SLIV, subsequent repetitions may be contiguously allocated (corresponding to an offset set to 1). However, if there is collision between the time resources determined by second SLIV and any of the time symbols of any repetition, then those particular symbols may not be used for this transmission. It is also noted that, in general, the time-domain resources of all subsequent transmissions may be determined based on the same symbol offset. Alternatively, for each subsequent repetition, a different symbol offset may be used.

Furthermore, the total number of repetitions associated with each of the configured TCI states may be determined by dividing the total number of repetitions, which is explicitly specified, by the number of TCI states actually used for transmission. Alternatively, for each entry, the total number of repetitions associated with a TCI state may be determined by counting the SLIVs in said TCI group of said entry.

In some embodiments in which the entry of TDRA table indicates time-domain resources not available for the transmissions, the processor, in operation, determines a mapping of the transmissions onto the time-domain resources. In the mapping, the length of the time-domain resources of each transmission is the same as the length indicated by the first SLIV for the first transmission. In the mapping, the transmissions are mapped, in accordance with a predetermined offset, starting from the start position of the time-domain resources for the first transmission indicated by the first SLIV, onto available time-domain resources of the two or more TCI states. Here, the predetermined offset may indicate the separation between the time-domain resources of consecutive transmissions. Each of the time-domain resources may be associated with one of the two or more TCI states in accordance with a predetermined pattern (in other words, the processor, in operation, determines, in accordance with the predetermined pattern, the association of the time-domain resources with the two or more TCI states).

Here, the term "mapping" refers to an allocation of time-domain resources to the transmissions, wherein each of the allocated time domain resources is associated with one of the (configured) TRPs/TCI states. In other words, a mapping assigns/allocates resources of the configured TCI states to the transmissions.

A more explicit example of a TDRA Table 8 according to the present embodiment is shown in TDRA Table 9.

TABLE 9

TDRA

| DCI index | PDSCH mapping type | K2 | SLIV 1 | SLIV 2 | (total) number of repetitions |
|---|---|---|---|---|---|
| 0 | B | 1 | {0, 3} | {5, 1} | 3 |
| 1 | B | 1 | {0, 5} | {6, 2} | 2 |

Figure 16:
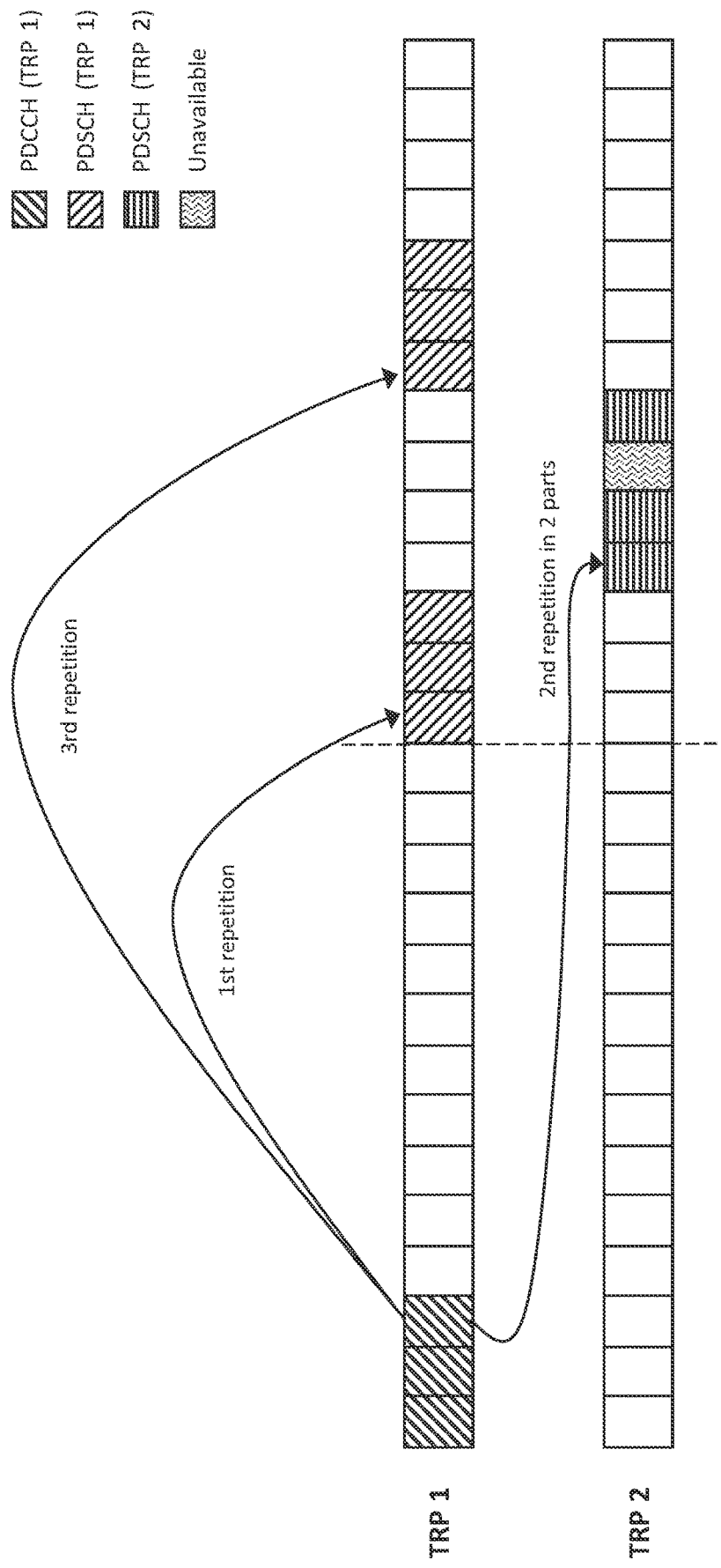
FIG. 16 is a schematic drawing illustrating a sixth example of time-domain resources of multiple TRPs.
Figure 17:
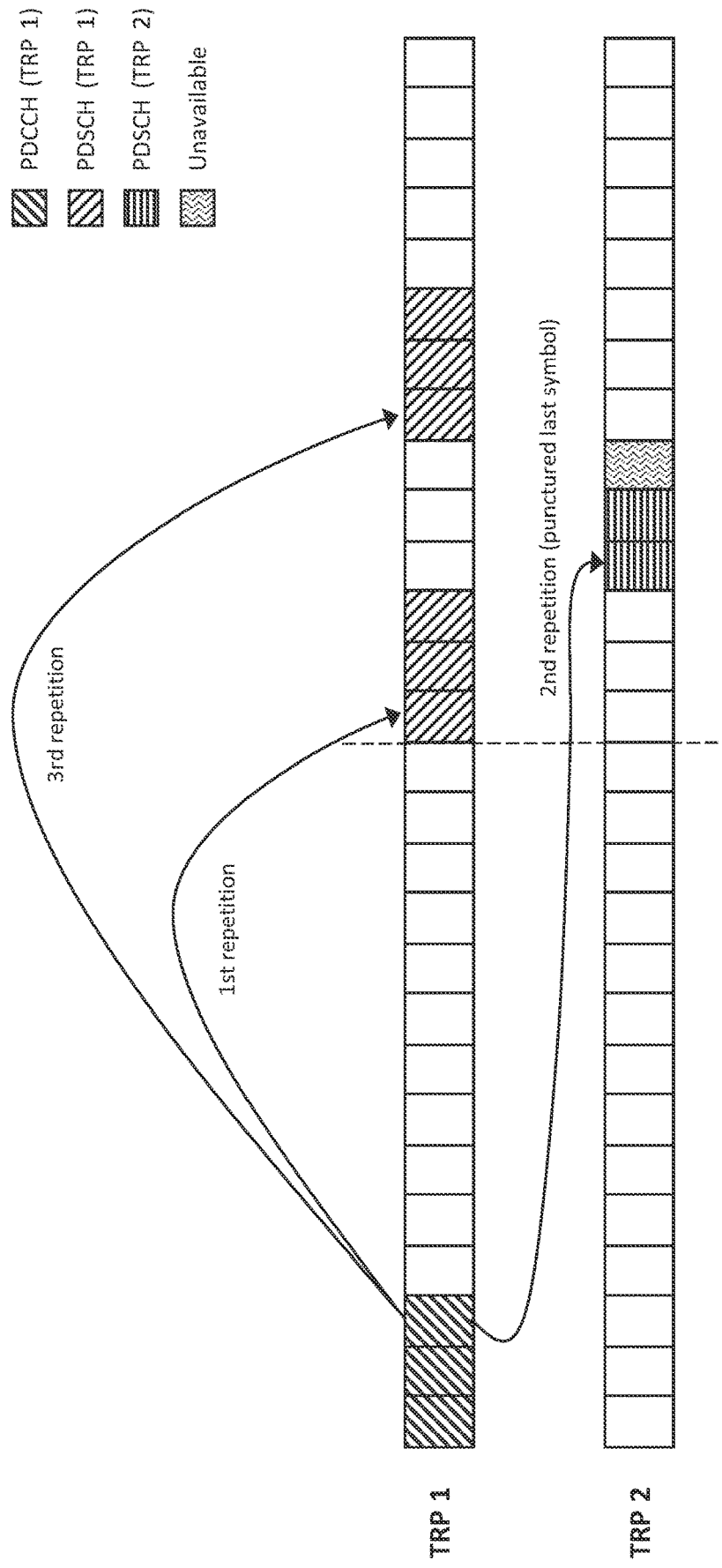
FIG. 17 is a schematic drawing illustrating a seventh example of time-domain resources of multiple TRPs.

If DCI index 0 of the TDRA Table 9 is indicated to the UE (and the mapping according to the present embodiment is used), then the time-domain resource allocation and association to TRPs or, in short, the mapping will be as shown in FIG. 16.

In particular, as in previous examples, the slot offset for starting the transmission is indicated to be "1" and, thus, the first repetitions starts in the slot after the DCI signaling (scheduling PDCCH).

In the present example, it further assumed that the UE is configured with symbol offset of 1 between repetitions; two TCI states, TCI state 1 and TCI state 2, whereat TCI state 1 is designated as the TCI state of the first repetition; and a pattern that changes the TCI state with every repetition (in an alternating manner).

Since the total number of repetitions is indicated as "3," there are two subsequent repetitions, namely a second repetition and a third repetition.

Based on the configured pattern and first TCI state, it can already be determined that there are two repetitions from are from TRP 1, namely the first and the third repetition. Likewise, it can be determined that there is one repetition from TRP 2, namely the second repetition.

Based on the symbol offset "1" and the index of the last symbol of the first repetition, "#2," it can be determined that the second repetition starts at symbol #3.

Based on SLIV 1 of the first entry, "{0,3},"  the first repetition will span 3 symbol, i.e., the time-domain resources of the first repetitions will be 3 (symbols). Furthermore, since for the subsequent repetitions the same length as for the first repetition is used, the time-domain resources of the second repetition and of the third repetition have a length of 3 (symbols) as well.

According to the present embodiment, the repetitions are mapped, starting from the start position indicated by the first SLIV, onto (only) the available time-domain resources of the configured TCI states. In detail:

Based on SLIV 1 of the first entry, "{0,3}" the start position of the first repetition is symbol #0, and, thus, the mapping start from symbol #0. Since, for the first repetition, there is no collision with the non-available resources, the first repetition is mapped onto symbols #0, #1, and #2.

More specifically, the second SLIV, "{5,1}" indicates that symbol #5 is not available for transmission (s). Thus, in the mapping, it may assumed that all symbols of TRP1 and TRP 2, except symbol #5 of TRP 1 and symbol #5 of TRP 2, are available.

Since the symbol offset is "1," the mapping continues with symbol #3, which is available. It is noted that, according to the present convention, the symbol offset corresponds to the difference between index of the last symbol of the first repetition and the index of the first symbol of the second repetition is 1. Thus, a symbol offset of "1" implies that there is no symbol between two consecutive transmissions.

Consequently, the second repetition will start from symbol #3. Symbol #4 is also available and, thus, symbol #4 is allocated to the second repetition as well. However, since symbol #5 is not available, the mapping of the second repetition onto resources continues with symbol #6, which is available. Thus, in summary, the second repetition is mapped onto the symbols #3, #4, and #6. In other words, the second repetition, includes a first part (symbol #3 and symbol #4) and a second part (symbol #6), which are separated by symbol #5.

The mapping continues with the available symbols #7, #8, and #9, on which the third repetition is mapped. It is noted that the entire transmission after the collision (at symbol #5) is shifted (in the present example, shifted by one symbol).

In some embodiments in which the entry of TDRA table indicates time-domain resources not available for the transmissions, the processor, in operation, determines a mapping of the transmissions onto the time-domain resources, in which the transmissions are mapped, in accordance with a predetermined offset, starting from the start position of the time-domain resources for the first transmission indicated by the first SLIV, onto time-domain resources of the two or more TCI states. In the mapping: i) the predetermined offset indicates the separation between the time-domain resources of consecutive transmissions; ii) the time-domain resources onto which the transmissions are mapped include available and the non-available time-domain resources; iii) any transmission is mapped onto time-domain resources having the length indicated by the first SLIV for the first transmission, counting (available time-domain resources as well as) non-available time-domain resources (of the time-domain resources onto which a given transmission is mapped); iv) any transmission mapped onto time-domain resources including non-available time-domain resources is punctured; and/or v) each of the time-domain resources is associated with one of the two or more TCI states in accordance with a predetermined pattern (in other words, the processor, in operation, determines, in accordance with the predetermined pattern, the association of the time-domain resources with the two or more TCI states).

As in the above, the term "mapping" refers to an allocation of time-domain resources to the transmissions, wherein each of the allocated time domain resources is associated with one of the (configured) TRPs/TCI states. In other words, a mapping assigns/allocates resources of the configured TCI states to the transmissions.

Another explicit example of a TDRA Table 8 according to the present embodiment is shown in TDRA Table 10. It is noted that TDRA Table 10 corresponds to TDRA Table 9.

TABLE 10

| | TDRA | | | | |
|---|---|---|---|---|---|
| DCI index | PDSCH mapping type | K2 | SLIV 1 | SLIV 2 | (total) number of repetitions |
| 0 | B | 1 | {0, 3} | {5, 1} | 3 |
| 1 | B | 1 | {0, 5} | {6, 2} | 2 |

If DCI index 0 of the TDRA Table 10 is indicated to the UE (and the mapping according to the present embodiment is used), then the time-domain resource allocation and association to TRPs or, in short, the mapping will be as shown in FIG. 16.

It is noted that the present embodiment differs from the previous embodiment in that the colliding symbols of transmissions are punctured (and not shifted). The differences thus mainly concerns the mapping starting from the collision of the second repetition at symbol #5. In the following mainly the differences to the mapping to the preceding embodiment are highlighted.

According to the present embodiment, the repetitions are mapped, starting from the start position indicated by the first SLIV, onto the available and not available time-domain resources of the configured TCI states. In particular, each transmission is mapped onto time-domain resources of the same length, e.g., the length explicitly indicated by the first SLIV. Here, the length of the time-domain resources onto which a given transmission is mapped, is "the length of the available time-domain resources onto which the given transmission is mapped" plus "the length of the not available time-domain resources onto which the given transmission is mapped." In other words the not-available resources onto which a transmission is mapped count toward/contribute to the length of the time-domain resources onto which the transmission is mapped. In detail:

Based on SLIV 1 of the first entry, "{0,3}," the start position of the first repetition is symbol #0, and, thus, the mapping start from symbol #0. Furthermore, each repetition has the same length of "3." It is noted that, in the present embodiment the repetitions are mapped also on not available time-domain resources, which, thus, are counted for the lengths of the repetition. In other words, the total number of symbols (i.e., available and not available time-domain resources) onto which a given repetition is mapped is, in the present embodiment, considered to be the length of said repetitions.

Thus, assuming again an offset of 1, the first repetition is mapped onto symbols #0, #1, and #2; the second repetition is mapped onto symbols #3, #4, and #5; and the third repetition is mapped onto symbols #6, #7, and #8.

However, as in the preceding embodiment, symbol #5, onto which the second repetition is mapped, is not available.

Thus, according to the present embodiment, the first entry of TDRA Table 10 (implicitly) indicates for the second repetition only the symbols #3 and #4. In other words, the second repetition is punctured to match the length of the available resources onto which the second repetition is mapped.

The present embodiments (e.g., a TDRA table of the form of TDRA Table 8, 9, or 10), allows to indicate time-domain resources that are not available for transmission. This may facilitate scheduling of available time-domain resources without causing a collision of the repetitions with the non-available resource.

In general, the processor, in operation, may determine 1020, in accordance with the TCI indicator, the TDRA table from at least two predetermined TDRA tables.

Figure 10:
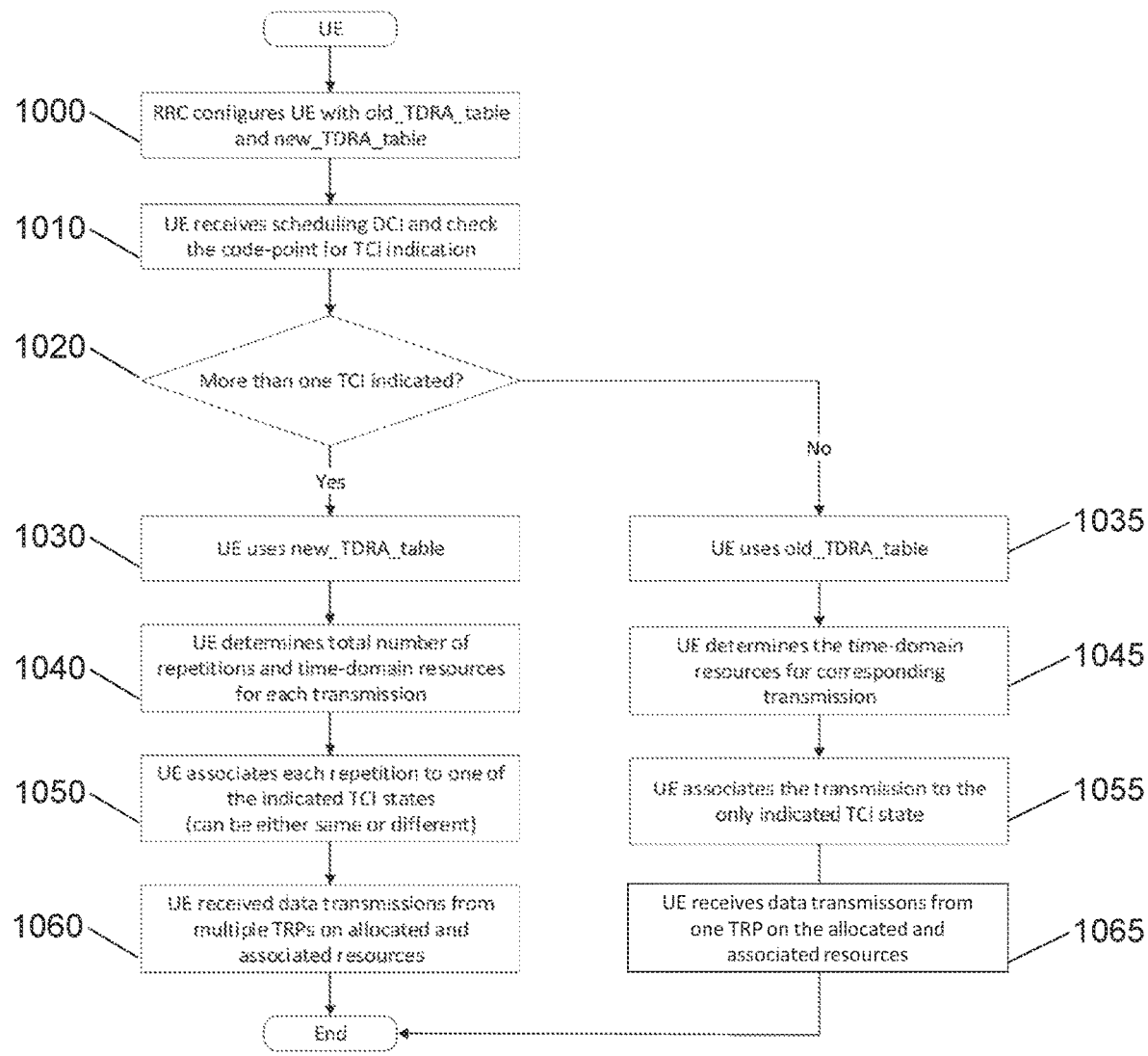
FIG. 10 is a flow diagram illustrating method performed in a UE.

In some embodiments the UE is configured with more than one TDRA table. As illustrated in FIG. 10, the UE may be configured 1000 by RRC with an old TDRA table and a new TDRA table. For instance, the old TDRA table may indicate only time-domain resources of one TCI state, and the new TDRA table may indicate time-domain resources of two or more TCI states. In general, the UE may then be configured to use the old TDRA table when the TCI indicator indicates that not more than one TCI states are indicates/configured in the DCI signaling. When, however, the TCI indicator indicates that in a corresponding DCI signaling more than one TCI states are indicates/configured, the UE may be configured to use the new TDRA table (i.e., to take the entry from the new TDRA table instead of the old TDRA table). In general, the TCI indicator does not have to be indicated as a separate bit-field. It may be indicated jointly with another parameter or other parameters. In other words, one or more of codepoints of such joint bit-field may indicate that there is one TRP employed, while one or more other codepoints may indicate that there are two TRPs employed. Similarly, any number of TRPs may be signaled by one or more codepoints of a joint bit-field carrying such TCI indicator.

FIG. 10 is an exemplary method for a UE. In step 1000, the UE is reconfigured via RRC signaling with an old_TDRA_table and a new_TDRA_table. The old_TDRA_table is a table for the case in which there is only one TRP active The new_TDRA_table is a table for the case in which two or more TRPs are active for the transmission and/or reception of data by the UE. In step 1010, the UE receives a scheduling DCI (e.g., on the PDCCH which the UE monitors) and checks the code-point for the TCI indication. In step 1020, the UE assesses (evaluates/judges), whether the TCI indication indicates more than one TCI states. If more than one TCI states are indicated (Yes in step 1020), the UE uses the new_TDRA_table in step 1030. In other words, the UE adopts the new table for determination of the resource allocation. Then, in step 1040, the UE determines the total number of repetition and time-domain resources for each transmission (e.g., each repetition). It is noted that this disclosure is not limited to the repetitions and the transmissions may also be transmissions of different transport blocks. The order of steps 1030 and 1040 can be reversed. In step 1050, the UE associates each repetition (or, in general, transmission) to one of the indicated TCI states. The repetitions (transmissions) can be associated to the same or to different TCI states. Finally, in step 1060, the UE receives data in downlink (or transmits the data in uplink) from the multiple TRPs (TCI states) on the allocated and associated resources.

If in step 1020, only one TCI state is indicated (No in step 1020), then the UE uses (applies) old_TDRA_table in step 1035. In step 1045, the UE determines the time-domain resources for the corresponding transmission. In step 1055, the UE associates the transmission to the only indicated TCI state. Finally, in step 1065, the UE receives data transmissions from the one TRP on the allocated resources.

For instance, in NR Rel. 16, it has been agreed to indicate 2 TCI states (instead of 1 TCI state in Rel. 15) using code-point of TCI bit-field, which basically implies 2-TRP transmissions are possible.

The switching of the TDRA table to be used/applied in accordance with the TCI indicator offers the flexibility to change the TDRA table.

In general, the transmissions may be repetitions of a same data portion.

Figure 18:
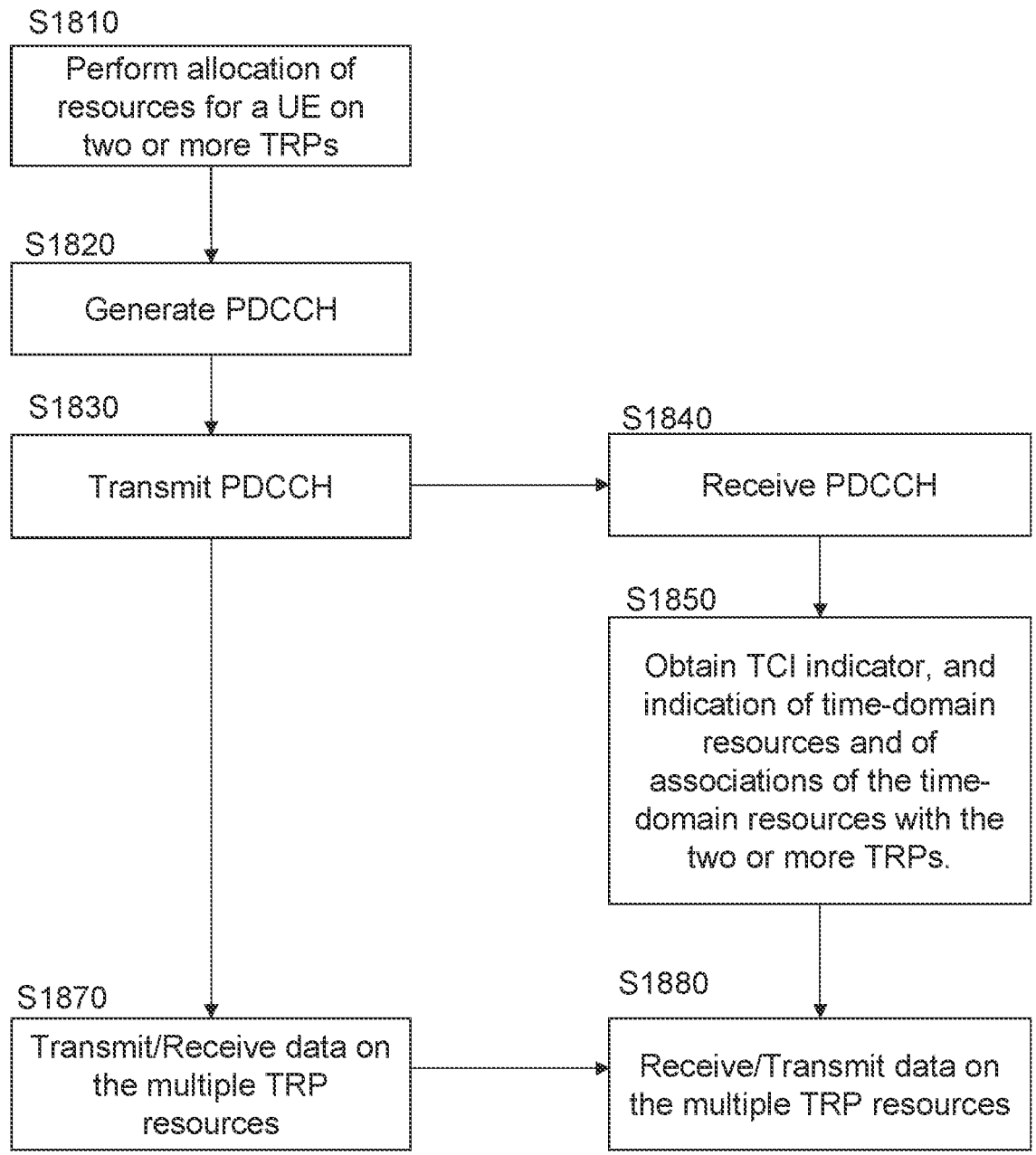
FIG. 18 is a flow diagram illustrating methods performed at the UE and the base station.

FIG. 18 illustrates the methods performed at both, a UE and a base station which are in communication with each other.

According to another embodiment, a method for a user equipment, UE, is provided. The method comprises a step S1840 of receiving downlink control information, DCI, signaling within PDCCH. Moreover, the method includes a step S1850 of obtaining from the DCI signaling a Transmission Configuration Indication, TCI, indicator specifying that two or more TCI states are configured; and an indication indicating time-domain resources for transmissions and associations of the time-domain resources with the two or more TCI states, wherein each of the time-domain resources is associated with one of the two or more TCI states. The method further comprises the step S1880 of receiving or transmitting, for each of the two or more TCI states, data on the time domain resources associated with the respective TCI state (and as indicated in the DCI signaling).

According to another embodiment, a method to be performed at a base station is provided. The method may comprise the step S1810 of performing allocation of time-domain resources of more than one TRP to be indicated to a UE for transmissions. In accordance with the allocation, in step S1820 the base station generates a DCI downlink control information, DCI, signaling, carried on the PDCCH in a manner so as to provide within the DCI signaling a Transmission Configuration Indication, TCI, indicator specifying that two or more TCI states are configured; and an indication indicating time-domain resources for transmissions and associations of the time-domain resources with the two or more TCI states, wherein each of the time-domain resources is associated with one of the two or more TCI states. The method further comprises the step S1830 of transmitting the DCI signaling; and the step S1870 of receiving or transmitting, for each of the two or more TCI states, data on the time-domain resources associated with the respective TCI state (and as indicated in the DCI signaling).

The present disclosure can be realized by software, hardware, or software in cooperation with hardware. Each functional block used in the description of each embodiment described above can be partly or entirely realized by an LSI (Large Scale Integration) such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

According to a first embodiment, user equipment, UE, is provided. The UE comprises a transceiver, which in operation receives downlink control information, DCI, signaling; and a processor which, in operation, obtains from the DCI signaling: a Transmission Configuration Indication, TCI, indicator specifying that two or more TCI states are configured; and an indication indicating time-domain resources for transmissions and associations of the time-domain resources with the two or more TCI states, wherein each of the time-domain resources is associated with one of the two or more TCI states; wherein the transceiver, in operation, receives or transmits, for each of the two or more TCI states, data on the time-domain resources associated with the respective TCI state.

In addition to the first embodiment, according to a second embodiment, the indication is an index indicating an entry of a Time-Domain Resource Assignment, TDRA, table.

In addition to the second embodiment, according to a third embodiment, the entry of the TDRA table includes, two or more sets of Start and Length Indicator Values, SLIVs, wherein each set corresponds to a respective TCI state, and each SLIV corresponds to a respective transmission and indicates: a start position of time-domain resources for the respective transmission, wherein the time-domain resources for the respective transmission are associated with that TCI state that corresponds to the set of the respective SLIV; and a length of the time-domain resources for the respective transmission.

In addition to the third embodiment, according to a fourth embodiment, each set includes not more than one SLIV; and the entry of the TDRA table includes an indication of a total number of the transmissions.

In addition to the fourth embodiment, according to a fifth embodiment, the processor, in operation, determines: for each set including one SLIV, a start position and a length of time-domain resources for a respective first transmission in accordance with that SLIV included in the set; and/or for each transmission that is not one of the first transmissions: an association of time-domain resources for the transmission with one of the two or more TCI states in accordance with: a pattern that indicates a sequence of TCI states and corresponds to start positions of the time-domain resources for the first transmissions; a length of the time-domain resources for the transmission in accordance with: a length of the time-domain resources for a respective first transmission, wherein the time-domain resources for the respective first transmission and the time-domain resources for the transmission are associated with a same TCI state; and/or a start position of the time-domain resources for the transmission in accordance with: an offset, start position and length of time-domain resources for one of the transmissions preceding the transmission, wherein the offset corresponds to start positions and/or lengths of time-domain resources for at least two first transmissions.

In addition to the second embodiment, according to a sixth embodiment, the entry of the TDRA table includes: an indication of a total number of the transmissions; an indication of an offset between the transmissions; and a single SLIV that indicates: a start position of time-domain resources for a first transmission, and a length of the time-domain resources for the first transmission.

In addition to the sixth embodiment, according to a seventh embodiment, the processor, in operation, determines: the start position of the time-domain resources for the first transmission in accordance with the start position indicated by the single SLIV for the first transmission; the length of the time-domain resources for the first transmission in accordance with the length indicated by the single SLIV for the first transmission; and/or for each transmission that is not the first transmission: (i) a length of time-domain resources for the transmission in accordance with the length of the time-domain resources for the first transmission; (ii) a start position of time-domain resources for the transmission in accordance with: the indication of the offset, and the start position and the length of the time-domain resources for the first transmission; and/or (iii) an association of the time-domain resources for the transmission with the two or more TCI states in accordance with a predetermined pattern.

In addition to the second embodiment, according to an eighth embodiment, the entry of the TDRA table includes: an indication of a total number of the transmissions; a first SLIV that indicates: (i) a start position of time-domain resources for a first transmission, and (ii) a length of the time-domain resources for the first transmission; and a second SLIV that indicates: (i) a start position of time-domain resources not available for the transmissions, and (ii) a length of the time-domain resources not available for the transmissions.

In addition to the eighth embodiment, according to a ninth embodiment, the processor, in operation, determines a mapping of the transmissions onto the time-domain resources, in which: the length of the time-domain resources of each transmission is the same as the length indicated by the first SLIV for the first transmission; the transmissions are mapped, in accordance with a predetermined offset, starting from the start position of the time-domain resources for the first transmission indicated by the first SLIV, onto available time-domain resources of the two or more TCI states, wherein the predetermined offset indicates a separation between the time-domain resources of consecutive transmissions; and each of the time-domain resources is associated with one of the two or more TCI states in accordance with a predetermined pattern.

In addition to the eighth embodiment, according to a tenth embodiment, the processor, in operation, determines a mapping of the transmissions onto the time-domain resources, in which the transmissions are mapped, in accordance with a predetermined offset, starting from the start position of the time-domain resources for the first transmission indicated by the first SLIV, onto time-domain resources of the two or more TCI states, wherein: the predetermined offset indicates a separation between the time-domain resources of consecutive transmissions; the time-domain resources onto which the transmissions are mapped include available and the non-available time-domain resources; any transmission is mapped onto time-domain resources having the length indicated by the first SLIV for the first transmission, counting non-available time-domain resources; any transmission mapped onto time-domain resources including non-available time-domain resources is punctured; and each of the time-domain resources is associated with one of the two or more TCI states in accordance with a predetermined pattern.

In addition to any of the first to tenth embodiment, according to an eleventh embodiment, the processor, in operation, determines, in accordance with the TCI indicator, the TDRA table from at least two predetermined TDRA tables.

In addition to any of the first to eleventh embodiment, according to an twelfth embodiment, the transmissions are repetitions of a same data portion.

According to a thirteenth embodiment, a base station is provided, comprising: a processor which, in operation, generates downlink control information, DCI, signaling, which indicates: a Transmission Configuration Indication, TCI, indicator specifying that two or more TCI states are configured; and time-domain resources for transmissions and associations of the time-domain resources with the two or more TCI states, wherein each of the time-domain resources is associated with one of the two or more TCI states; and further comprising a transceiver, which, in operation, transmits the DCI signaling; and receives or transmits, for each of the two or more TCI states, data on the time-domain resources associated with the respective TCI state.

According to a fourteenth embodiment, a method is provided for a user equipment, UE, comprising the steps of: receiving downlink control information, DCI, signaling; and obtaining from the DCI signaling: (i) a Transmission Configuration Indication, TCI, indicator specifying that two or more TCI states are configured; and (ii) an indication indicating time-domain resources for transmissions and associations of the time-domain resources with the two or more TCI states, wherein each of the time-domain resources is associated with one of the two or more TCI states; and receiving or transmitting, for each of the two or more TCI states, data on the time-domain resources associated with the respective TCI state.

According to a fifteenth embodiment, a method is provided for a base station, comprising the steps of: generating downlink control information, DCI, signaling, which indicates: (i) a Transmission Configuration Indication, TCI, indicator specifying that two or more TCI states are configured; and (ii) time-domain resources for transmissions and associations of the time-domain resources with the two or more TCI states, wherein each of the time-domain resources is associated with one of the two or more TCI states; transmitting the DCI signaling; and receiving or transmitting, for each of the two or more TCI states, data on the time-domain resources associated with the respective TCI state.

It is noted that second to twelfth embodiments are correspondingly applicable to the scheduling device of the thirteenth embodiment. Moreover, the steps performed by the circuitry in operation as well as the steps of the transceiver referred to in the above UE and base station embodiments correspond to the respective methods.

In addition, a non-transitory medium is provided storing program instructions which, when executed on a processing circuitry such as a general purpose processor perform all steps of any of the above mentioned method embodiments.

Summarizing, the present disclosure relates to a user equipment, UE, and a scheduling node, as well as to the corresponding methods. In particular, a downlink control information, DCI, signaling carries a Transmission Configuration Indication, TCI, indicator specifying that two or more TCI states are configured; and an indication indicating time-domain resources for transmissions and associations of the time-domain resources with the two or more TCI states, wherein each of the time-domain resources is associated with one of the two or more TCI states; wherein the transceiver, in operation, receives or transmits, for each of the two or more TCI states, data on the time-domain resources associated with the respective TCI state.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A user equipment (UE), comprising:
a transceiver, which, in operation, receives downlink control information (DCI) signaling; and
a processor, which, in operation, obtains from the DCI signaling:
a Transmission Configuration Indication (TCI) indicator specifying that two or more TCI states are configured; and an indication indicating time-domain resources for transmissions and associations of the time-domain resources with the two or more TCI states, wherein each of the time-domain resources is associated with one of the two or more TCI states;

wherein
the transceiver, in operation, receives, for each of the two or more TCI states, data on the time-domain resources associated with the respective TCI state, and the processor, in operation, determines a mapping of the transmissions from a base station onto the time-domain resources including a first time-domain resource and a second time-domain resource within a slot for consecutive transmissions, in accordance with a predetermined offset, wherein, in a case where the UE is semi-statically configured by the base station with a value K in the predetermined offset, a first symbol of the second time-domain resource starts after K symbols from a last symbol of the first time-domain resource.

2. The user equipment according to claim 1, wherein the indication is an index indicating an entry of a Time-Domain Resource Assignment (TDRA) table.

3. The user equipment according to claim 2, wherein the entry of the TDRA table includes, two or more sets of Start and Length Indicator Values (SLIVs), wherein each set corresponds to a respective TCI state, and each SLIV corresponds to a respective transmission and indicates:
a start position of time-domain resources for the respective transmission, wherein the time-domain resources for the respective transmission are associated with that TCI state that corresponds to the set of the respective SLIV; and
a length of the time-domain resources for the respective transmission.

4. The user equipment according to claim 3, wherein each set includes not more than one SLIV; and
the entry of the TDRA table includes an indication of a total number of the transmissions.

5. The user equipment according to claim 4, wherein the processor, in operation, determines:
for each set including one SLIV, a start position and a length of time-domain resources for a respective first transmission in accordance with that SLIV included in the set; and/or
for each transmission that is not one of the first transmissions:
an association of time-domain resources for the transmission with one of the two or more TCI states in accordance with: a pattern that indicates a sequence of TCI states and corresponds to start positions of the time-domain resources for the first transmissions; and/or
a length of the time-domain resources for the transmission in accordance with: a length of the time-domain resources for a respective first transmission, wherein the time-domain resources for the respective first transmission and the time-domain resources for the transmission are associated with a same TCI state.

6. The user equipment according to claim 2, wherein the entry of the TDRA table includes:
an indication of a total number of the transmissions; and a single Start and Length Indicator Value (SLIV) that indicates:
a start position of time-domain resources for a first transmission, and
a length of the time-domain resources for the first transmission.

7. The user equipment according to claim 6, wherein the processor, in operation, determines:
the start position of the time-domain resources for the first transmission in accordance with the start position indicated by the single SLIV for the first transmission;
the length of the time-domain resources for the first transmission in accordance with the length indicated by the single SLIV for the first transmission; and/or
for each transmission that is not the first transmission:
a length of time-domain resources for the transmission in accordance with the length of the time-domain resources for the first transmission;
and/or
an association of the time-domain resources for the transmission with the two or more TCI states in accordance with a predetermined pattern.

8. The user equipment according to claim 2, wherein the entry of the TDRA table includes:
an indication of a total number of the transmissions;
a first Start and Length Indicator Value (SLIV) that indicates:
a start position of time-domain resources for a first transmission, and
a length of the time-domain resources for the first transmission; and
a second SLIV that indicates:
a start position of time-domain resources not available for the transmissions, and
a length of the time-domain resources not available for the transmissions.

9. The user equipment according to claim 8, wherein the processor, in operation, determines the mapping of the transmissions onto the time-domain resources, in which:
the length of the time-domain resources of each transmission is the same as the length indicated by the first SLIV for the first transmission;
the transmissions are mapped, in accordance with the predetermined offset, starting from the start position of the time-domain resources for the first transmission indicated by the first SLIV, onto available time-domain resources of the two or more TCI states; and
each of the time-domain resources is associated with one of the two or more TCI states in accordance with a predetermined pattern.

10. The user equipment according to claim 8, wherein the processor, in operation, determines the mapping of the transmissions onto the time-domain resources, in which
the transmissions are mapped, in accordance with the predetermined offset, starting from the start position of the time-domain resources for the first transmission indicated by the first SLIV, onto time-domain resources of the two or more TCI states, wherein:
the time-domain resources onto which the transmissions are mapped include available and non-available time-domain resources;
any transmission is mapped onto time-domain resources having the length indicated by the first SLIV for the first transmission, counting the non-available time-domain resources;

any transmission mapped onto time-domain resources including the non-available time-domain resources is punctured; and each of the time-domain resources is associated with one of the two or more TCI states in accordance with a predetermined pattern.

11. The user equipment according to claim 1, wherein the processor, in operation, determines, in accordance with the TCI indicator, a Time-Domain Resource Assignment (TDRA) table from at least two predetermined TDRA tables.

12. The user equipment according to claim 1, wherein the transmissions are repetitions of a same data portion.

13. A base station, comprising:
a processor, which, in operation, generates downlink control information (DCI) signaling, which indicates:
a Transmission Configuration Indication (TCI) indicator specifying that two or more TCI states are configured; and
time-domain resources for transmissions and associations of the time-domain resources with the two or more TCI states, wherein each of the time-domain resources is associated with one of the two or more TCI states; and
a transceiver, which, in operation,
transmits the DCI signaling to a user equipment (UE); and
transmits to the UE, for each of the two or more TCI states, data on the time-domain resources associated with the respective TCI state,
wherein,
the processor, in operation, determines a mapping of the transmissions from the base station onto the time-domain resources including a first time-domain resource and a second time-domain resource within a slot for consecutive transmissions, in accordance with a predetermined offset, wherein, in a case where the UE is semi-statically configured by the base station with a value K in the predetermined offset, a first symbol of the second time-domain resource starts after K symbols from a last symbol of the first time-domain resource.

14. A method for a user equipment (UE) comprising the steps of:
receiving downlink control information (DCI) signaling;
obtaining from the DCI signaling:
a Transmission Configuration Indication (TCI) indicator specifying that two or more TCI states are configured; and
an indication indicating time-domain resources for transmissions and associations of the time-domain resources with the two or more TCI states, wherein each of the time-domain resources is associated with one of the two or more TCI states;
determining a mapping of the transmissions from a base station onto the time-domain resources including a first time-domain resource and a second time-domain resource within a slot for consecutive transmissions, in accordance with a predetermined offset, wherein, in a case where the UE is semi-statically configured by the base station with a value K in the predetermined offset, a first symbol of the second time-domain resource starts after K symbols from a last symbol of the first time-domain resource; and
receiving, for each of the two or more TCI states, data on the time-domain resources associated with the respective TCI state.

* * * * *